(12) United States Patent
Barnes et al.

(10) Patent No.: US 9,440,863 B2
(45) Date of Patent: Sep. 13, 2016

(54) METHOD AND APPARATUS FOR REMOVING ACID-GASES FROM HYDROCARBON-BEARING SALTWATER SOLUTION

(71) Applicant: Apache Corporation, Houston, TX (US)

(72) Inventors: Christopher M. Barnes, Houston, TX (US); Ty Hanna, Houston, TX (US)

(73) Assignee: APACHE CORPORATION, Houston, TX (US)

( * ) Notice: Subject to any disclaimer, the term of this patent is extended or adjusted under 35 U.S.C. 154(b) by 0 days.

(21) Appl. No.: 14/993,652

(22) Filed: Jan. 12, 2016

(65) Prior Publication Data

US 2016/0200592 A1    Jul. 14, 2016

Related U.S. Application Data

(60) Provisional application No. 62/102,309, filed on Jan. 12, 2015.

(51) Int. Cl.

| | |
|---|---|
| *C02F 1/20* | (2006.01) |
| *C02F 1/66* | (2006.01) |
| *C02F 9/00* | (2006.01) |
| *B01D 53/14* | (2006.01) |
| *B01D 53/18* | (2006.01) |
| *C10L 3/10* | (2006.01) |
| *C02F 101/10* | (2006.01) |

(Continued)

(52) U.S. Cl.
CPC ............ *C02F 1/20* (2013.01); *B01D 53/1406* (2013.01); *B01D 53/1462* (2013.01); *B01D 53/18* (2013.01); *C02F 1/66* (2013.01); *C02F 9/00* (2013.01); *C10L 3/102* (2013.01); *C02F 2101/101* (2013.01); *C02F 2103/18* (2013.01); *C02F 2103/365* (2013.01); *C10L 2290/545* (2013.01)

(58) Field of Classification Search
CPC .............. C02F 1/20; C02F 1/66; C02F 9/00; C02F 2101/101; C02F 2101/40; C02F 2103/18; C02F 2103/365; B01D 53/1406; B01D 53/1462; B01D 53/18; C10L 3/102; C10L 3/103; C10L 3/104; C10L 2290/545
See application file for complete search history.

(56) References Cited

U.S. PATENT DOCUMENTS

| | | |
|---|---|---|
| 3,725,270 A | 4/1973 | Tassoney |
| 3,754,376 A | 8/1973 | Kent |

(Continued)

FOREIGN PATENT DOCUMENTS

EP        0753334 A1    1/1997

*Primary Examiner* — Lucas Stelling
(74) *Attorney, Agent, or Firm* — Constance Rhebergen; Kevin Tamm; Bracewell LLP

(57) ABSTRACT

A method for removing acid-gases from water includes introducing acid into a flow of aqueous solution having acid-gases and associated conjugate bases having an initial pH to lower the pH. The lowered pH solution has a stripping gas passed therethrough, resulting in a vapor phase of liberated acid-gas and stripping gas vapors, and a liquid phase comprising a lower concentration of acid-gases and associated conjugate bases than the aqueous solution. The liberated acid-gas and stripping gas vapors are collected and treated to remove acid-gas components, resulting in clean stripping gas product. The liquid phase is separated and collected with a second treating step, resulting in a final aqueous product having a lower concentration of acid-gases and associated conjugate bases than the liquid phase.

30 Claims, 8 Drawing Sheets

(51) Int. Cl.
  *C02F 103/18* (2006.01)
  *C02F 103/36* (2006.01)

(56) References Cited

U.S. PATENT DOCUMENTS

| | | | |
|---|---|---|---|
| 3,821,110 A | 6/1974 | Luetzelschwab | |
| 4,260,462 A | 4/1981 | Didycz | |
| 4,468,237 A | 8/1984 | Fuderer | |
| 4,735,723 A | 4/1988 | Mulder | |
| 4,816,039 A | 3/1989 | Krishnamurthy | |
| 4,983,297 A | 1/1991 | Kaczmarek | |
| 5,415,681 A | 5/1995 | Baker | |
| 5,536,300 A | 7/1996 | Reinhold | |
| 6,558,452 B1 | 5/2003 | Stonner | |
| 7,431,902 B2 | 10/2008 | Kerley | |
| 7,481,988 B2 | 1/2009 | Katz | |
| 7,740,687 B2 | 6/2010 | Reinhold | |
| 7,763,100 B2 | 7/2010 | Baksh | |
| 8,518,159 B2 | 8/2013 | McCorriston | |
| 8,603,427 B2 | 12/2013 | Sato | |
| 8,685,236 B2 | 4/2014 | Miller | |
| 9,028,679 B2 | 5/2015 | Morris | |
| 2007/0199902 A1 | 8/2007 | Mueller | |
| 2007/0246401 A1* | 10/2007 | Al-Faqeer | B01D 53/002 208/251 R |
| 2011/0272365 A1 | 11/2011 | DeFosse | |
| 2014/0238902 A1 | 8/2014 | Morris | |

* cited by examiner

METHOD AND APPARATUS FOR REMOVING ACID-GASES FROM HYDROCARBON-BEARING SALTWATER SOLUTION

PRIORITY CLAIM

This application is a non-provisional application of and claims priority to U.S. Prov. Pat. App. No. 62/102,309, the entire disclosure of which is hereby expressly incorporated herein by reference.

FIELD

The present disclosure relates to methods and systems for removing acid-gases and their associated conjugate bases from water in a mixed production stream comprising water, natural gas, and optionally oil and natural gas condensate. More specifically, example methods and systems described herein relate to separation of mixed production fluids, treatment of a gaseous phase separated from the mixed fluids to remove acid-gas components from the gas stream, and subsequent use of the sweetened gas phase as an agent for treating sour water separated from the mixed production fluids to remove acid-gas components from the aqueous stream. Furthermore, example methods and systems described herein relate to the substantially complete and irreversible removal of acid-gas components to enable safe and economic reuse or downhole injection of impaired fluids without the risk of souring downstream systems.

BACKGROUND

Fluids that are contaminated with significant concentrations of acid-gases, such as, for example $H_2S$ or $CO_2$, are herein referred to as sour. Conversely, fluids with substantially reduced or negligible concentrations of acid-gases are herein referred to as sweet. Sour fluids may occur naturally in both subterranean formations or at the surface, resulting from either thermogenic or microbiological processes. Sour fluids may also occur as a result of various industrial processes. For example, sour water may result from a process in which a sweet aqueous phase is used to strip acid-gases from a sour process vapor stream. Sour gas may result from a process in which sweet gas is used to strip acid-gases from a sour process water stream. Sour water may present many challenges and hazards related to its handling at the surface, including corrosion risks and human health and safety risks. For example, hydrogen sulfide contributes to corrosion of steel materials and can cause asphyxiation. However, it may be desirable that such sour water be reused for some subsequent process, for example, as a fluid to be used for hydraulic fracturing operations, so acid-gas removal may be desired.

There exist methods and systems available for treating sour water, particularly for removing hydrogen sulfide, but they are limited in application. Examples of chemical agents include scavengers such as triazines, ethanolamines, and acrolein, and oxidants such as chlorine dioxide and ozone. Generally, chemical scavenging agents either react with acid-gases irreversibly to form new compounds, or they react reversibly to form intermediate compounds through mechanisms of encapsulation, absorption, dissociation, or de-protonation. Chemical scavengers that follow some irreversible reaction mechanism are limited in application by a stoichiometric ratio of chemical required per molecule of target acid-gas present in the aqueous solution. As such, the amount of scavenger chemical required for sweetening increases proportionately with the amount of target acid-gas in solution. Such treatments can become uneconomic at exceedingly high concentrations of acid-gas, for example greater than 100 ppmw ("parts per million by weight", commonly measured as mg/kg or mg/L in aqueous systems) of hydrogen sulfide in sour water. Other chemical scavengers that follow mechanisms of encapsulation, absorption, dissociation, or de-protonation tend to react reversibly such that a change in pH, pressure, temperature, or other stream conditions can lead to re-souring of the aqueous solution.

In some applications, gas stripping is a preferred method to remove volatile components, including dissolved acid-gases, from process liquid streams. Gas stripping is a process by which a stripping gas is introduced and mixed with a liquid process stream contaminated with volatile components, effecting a change in vapor-liquid equilibrium of the various system components relative to each other and resulting in a substantially reduced concentration of volatile components in the liquid process stream after separation of the mixed volatile components and stripping gas. Effectiveness of a gas stripping process is generally dependent on relative Henry's Law constants and may be improved by changing several process design factors such as increasing temperature, decreasing pressure, increasing the vapor-liquid contact efficiency, increasing the vapor to liquid molar flow ratio, and otherwise selecting a stripping gas composition and operating conditions so as to increase the mass transfer rate of acid-gas components from the process liquid into the injected stripping gas. Compared with chemical scavenger treatment mechanisms, gas stripping has the advantage of being more efficient at greater concentrations of acid-gas components and not being confined to stoichiometric limits. Being related to thermodynamic conditions, gas stripping treatment is designed to remove a fraction of target acid-gases that is independent of absolute acid-gas concentration. As such, the absolute removal of acid-gas components from a sour water stream increases as the initial concentration of acid-gas components in the stream increases, without requiring the addition of extra chemical or gas supply.

Efficient gas stripping may be obtained by using steam generated by boiling a portion of treated process water as the injected stripping gas. In other applications, air may be used as the stripping gas, and air may be pre-heated so as to increase the temperature of the overall system. Typically, these methods are used for applications in which gas stripping is used to remove low concentrations of acid-gases from otherwise substantially fresh water having a low concentration of total dissolved solid species that is, for example, less than 1,000 ppmw.

However, sour water resulting from oil and gas exploration and production operations commonly has substantial contamination from other components in addition to the souring components, such as hydrocarbons, suspended solids, salts, chlorides, multivalent cations, hardness, BTEX (commonly, the acronym referring to the combined species of benzenes, toluenes, ethylbenzenes, and xylenes), and the like. For oil and gas exploration and production operations in which hydrocarbons are likely to be present in produced water, maintaining an anoxic fluid system may be desired to reduce combustion risk associated with hydrocarbon and oxygen mixtures. Additionally, the total dissolved solids in water produced from hydrocarbon production wells, often in excess of 10,000 ppmw, and in some cases in excess of 100,000 ppmw, can result in scale formation on equipment internals. Boiling salt water with elevated total dissolved solids concentrations to generate steam to be used as a stripping gas is known to result in scale formation and solids deposition on equipment internals that decreases process efficiency and increases maintenance requirements. Thus, introducing an external stripping gas to a gas stripping process in replacement of steam may be desirable for treating waters with elevated total dissolved solids concentrations.

Efficiency of gas stripping is relatively independent of stripping gas composition, so long as the target acid-gas species has a similar affinity for each of the gases being compared for a gas stripping application. As such, natural gas, methane, air, steam, and nitrogen all represent viable options for stripping gas selection. Generally, the important requirement is that the stripping gas is substantially void of contamination by the target acid-gas component. Thus, the generally accepted requirement is that clean stripping gas is introduced to the process from an external source. However, in some applications, it may be desirable not to introduce an outside gas to the sour water treatment process, as this can add substantial cost and operational complexity that may make treatment uneconomic and inefficient.

Generally in oil and gas production operations, salt water is produced in the same mixed production stream with oil, natural gas, and natural gas condensate. Salt water is then separated from the mixed production stream to isolate hydrocarbon components of value. The existence of sour water from oil and gas extraction activities is the result of the mixed production stream also being sour. Because hydrogen sulfide and carbon dioxide gases partition into both the hydrocarbon and aqueous phases based on thermodynamic equilibrium conditions, the hydrocarbon split from a sour mixed production stream is generally also necessarily sour. As such, the natural gas stream that is produced with and is located in proximity to a sour produced water stream tends also to be sour. Such sour gas typically must be treated to remove acid-gas components before it can be used as an effective gas stripping agent because the presence of acid-gas components in the gas phase interferes with the stripping efficiency in a gas stripping process for sour water.

Completeness of gas stripping for removing acid-gases from sour water, although aided by the aforementioned process variables, is still limited by the equilibrium conditions imposed by Henry's Law and related vapor-liquid equilibrium considerations. Gas stripping targets and removes only volatile components dissolved in the process liquid and does not affect non-volatile components. Such non-volatile components may include the conjugate bases that form by the dissociation of acid-gases dissolved in water, for example the bisulfide and sulfide ionic derivatives of hydrogen sulfide, or the carbonic acid, bicarbonate, and carbonate species that are products of the reaction between carbon dioxide and water. In general, the dissolved form of an acid-gas tends to dominate at lesser pH values, and the conjugate base form tends to dominate at greater pH values. Regardless of pH, however, solubility and vapor-liquid equilibrium conditions dictate that an amount of a dissolved acid-gas in water exists as the conjugate base form. As a result, a gas stripping process alone cannot physically remove all acid-gas derivatives from water.

In some applications, in particular in the case of treating sour water from hydrocarbon producing wells for reuse, complete and irreversible removal of substantially all dissolved acid-gas forms is desirable and necessary to ensure safe handling of the fluids. Removal of the gaseous species without removal of the associated conjugate base species leaves the potential for sour gas release if the treated water is blended in an acidized process unit downstream. An example of such a downstream process is an "acid spearhead," an oil and gas well treatment operation associated with hydraulic fracturing. In this process, water blended at a very low pH, approximately less than 2, is used as a pre-conditioning treatment to dissolve certain rock minerals in a subterranean formation in preparation for hydraulic fracturing. In an application for which sour water is to be treated and reused for hydraulic fracturing, the blending of water with an acid to result in a pH of less than about 2 could result in fluid recontamination and subsequent gaseous release of an acid-gas, if the treated water has conjugate base remaining (see FIGS. 2A and 2B).

In such applications, in which substantially complete removal of high concentrations of acid-gas components is desired, gas stripping pre-treatment may be combined with a subsequent aqueous-phase treatment process, such as the injection of acid-gas scavenging chemical, to ensure complete removal of acid-gases and associated conjugate bases.

SUMMARY

Embodiments of systems and methods of the present disclosure provide more efficient and cost-effective means for complete removal of elevated concentrations of acid-gases and related conjugate bases from hydrocarbon-bearing saltwater solutions than what has been previously disclosed. Embodiments of methods and systems substantially remove both hydrogen sulfide and its related conjugate bases to ensure that safe handling, transfer, storage, and reuse of a sour process fluid is possible. Certain methods and systems reduce or eliminate the risk of recontamination of hydrogen sulfide vapors by downstream process units. Methods and systems operate efficiently to minimize cost associated with introducing external stripping gas or causing a loss of natural gas product.

In some aspects, the use of sour gas co-produced with sour water as a stripping agent is desirable in a co-localized processing facility designed to treat both sour products. For applications where introducing outside stripping gas is cost-prohibitive or otherwise unavailable, embodiments of methods and systems disclosed herein efficiently use the comingled natural gas produced in a mixed production stream as a stripping gas agent.

Furthermore, this disclosure relates to water treatment in the oil and gas industry in which anoxic conditions are desirable and the addition of heat is undesirable. In some aspects, a process described herein may be useful for treating highly sour (e.g., hydrogen sulfide-containing), hydrocarbon-bearing salt water produced from subsurface formations to remove acid-gases and acid-gas conjugate bases, such as hydrogen sulfide and carbon dioxide and their dissociated species that form in aqueous solutions. In some aspects, example methods and systems described herein may be useful for the treatment of aqueous fluids produced from subterranean formations as a consequence of oil and gas exploration and production operations, particularly as these operations relate to hydraulically fractured formations, to allow for the safe handling and use of these produced fluids for subsequent hydraulic fracturing operations, as a fluid injected for enhanced oil recovery ("EOR"), or to enable the safe disposal of these produced fluids in registered injection wells substantially without the risk of causing environmental contamination by hydrogen sulfide or souring subterranean injection formations.

Therefore, disclosed herein is a method for removing acid-gas contaminants from water. The method includes the steps of introducing a mixed production fluid comprising natural gas, water, and acid-gas components into a first separation apparatus; separating the mixed production fluid into at least a first distinct gas phase and a separate first distinct aqueous phase; collecting the first distinct aqueous phase and introducing an acid into the first distinct aqueous phase, the first distinct aqueous phase having a first concentration of acid-gases, a first concentration of associated conjugate bases, and a first pH, wherein the acid reduces the first pH of the first distinct aqueous phase to a second pH, the second pH being lower than the first pH; collecting the first distinct gas phase and treating the first distinct gas phase to remove acid-gas components therefrom, resulting in a second, substantially sweet gas phase that is substantially without acid-gas components; and passing at least a portion of the second, substantially sweet gas phase through the first distinct aqueous phase at the second pH, resulting in a vapor phase composed of liberated acid-gas and stripping gas vapors, and a second distinct aqueous phase comprising a lower concentration of acid-gases and associated conjugate bases relative to the first distinct aqueous phase.

The method further includes the steps of separating and collecting the liberated acid-gas and stripping gas vapors; treating the liberated acid-gas and stripping gas vapors to remove acid-gas components, resulting in a clean stripping gas product; separating and collecting the second distinct aqueous phase; and treating the second distinct aqueous phase with a second treatment step, resulting in a final aqueous product having a lower concentration of acid-gases and associated conjugate bases than the second distinct aqueous phase.

In some embodiments, the method further includes the step of raising the pH of the final aqueous product, using an alkaline material, for a particular end use. In some embodiments, the particular end use is hydraulic fracturing. In some embodiments, the particular end use is enhanced oil recovery. In some embodiments, the particular end use is registered waste disposal. In some embodiments, the final aqueous product has a combined concentration of a target acid-gas and associated conjugate base that is substantially zero. In other embodiments, a target acid-gas and associated conjugate base species are removed substantially irreversibly, in some embodiments to avoid the contamination of sweet hydrocarbon-bearing reservoirs by acid gases. Still in other embodiments, the step of passing at least a portion of the second, substantially sweet gas phase through the first distinct aqueous phase at the second pH is conducted at ambient conditions, without addition of heat to process fluids. In some embodiments of the method, the first distinct aqueous phase comprises hydrocarbons.

In other embodiments, the first distinct aqueous phase and second distinct aqueous phase comprise salt water. In some embodiments, a concentration of total dissolved solids in the first distinct aqueous phase exceeds 100,000 parts per million by weight (ppmw). Still in other embodiments, a concentration of hardness minerals in the first distinct aqueous phase exceeds 10,000 ppmw as CaCO3. In other embodiments of the method, the first distinct aqueous phase comprises produced water extracted from a subterranean formation. In certain embodiments, the second, substantially sweet gas phase is anoxic. In other embodiments, the second, substantially sweet gas phase comprises natural gas.

Still in other embodiments, the second, substantially sweet gas phase is reused again as a stripping gas. In some embodiments, a portion of the clean stripping gas product exits the process via a natural gas sales line. In certain embodiments, the method further includes the step of treating a portion of the clean stripping gas product to a further extent before the clean stripping gas product exits via a natural gas sales line. In some embodiments, the second treatment step comprises introducing chlorine dioxide to the second distinct aqueous phase. In other embodiments, the second treatment step comprises introducing acrolein to the second distinct aqueous phase. Still in other embodiments, a secondary treatment chemical is generated proximate a location of the second treatment step. In certain embodiments, the second treatment step comprises an introduction of chemicals selected to inhibit solids formation or deposition. In other embodiments, the second treatment step comprises the introduction of chemicals selected to remove contaminants other than selected acid-gases from the first distinct aqueous phase. In certain embodiments, the method is performed in batches. In other embodiments, the method is conducted in continuous feed. In embodiments of the method, there is substantially no lost stripping gas product and substantially no waste flare or external emissions of hydrocarbons.

Further disclosed herein is a system for removing acid-gas contaminants from water. The system includes a first feed inlet fluidly coupled to a separator to supply to the separator a mixed production fluid comprising at least natural gas, water, and acid-gas components; a second feed inlet fluidly coupled to a first gas contactor vessel to supply a gas phase having natural gas and acid-gas components, the first gas contactor vessel in fluid communication with a vapor outlet of the separator, wherein in the first gas contactor vessel a mixture of acid-gas, natural gas, and stripping gas vapors is treated to remove acid-gas components; a third feed inlet fluidly coupled to a mixer to supply to the mixer an aqueous solution having acid-gases and associated conjugate bases and having an initial pH, the mixer in fluid communication with a liquid outlet of the separator; a fourth feed inlet fluidly coupled to the mixer to supply acid to the aqueous solution in the mixer; a fifth feed inlet fluidly coupled to a second gas contactor vessel, the second gas contactor vessel in fluid communication with an outlet of the mixer; and a sixth feed inlet to the second gas contactor vessel, the second gas contactor vessel in fluid communication with a vapor outlet of the first gas contactor vessel to supply stripping gas to the aqueous solution in the second gas contactor vessel.

The system further includes a seventh feed inlet to the first gas contactor vessel, the first gas contactor vessel in fluid communication with a vapor outlet of the second gas contactor vessel; an eighth feed inlet to an acid-gas scavenging contactor vessel, the acid-gas scavenging contactor vessel in fluid communication with a liquid outlet of the second gas contactor vessel; and a ninth feed inlet to the acid-gas scavenging contactor vessel fluidly coupled to a supply of acid-gas scavenger chemical.

In some embodiments of the system, the mixer, the second gas contactor vessel, and acid-gas scavenging contactor vessel are formed as a single contactor unit. In certain embodiments, the system further includes a tenth feed inlet to an alkaline contactor vessel to supply alkaline chemical to the aqueous solution conducted therein by an eleventh feed inlet in fluid communication with a liquid outlet of the acid-gas scavenging contactor vessel. In other embodiments, the second gas contactor vessel comprises an internal sparge bar. Still in other embodiments, the internal sparge bar is used to introduce stripping gas to the aqueous solution. In some embodiments, the first gas contactor vessel is substantially horizontal. Still in yet other embodiments, the system further comprises a recycle loop to transfer fluid from one portion of the second gas contactor vessel to another portion thereof. In embodiments of the system, there is substantially no lost stripping gas product and substantially no waste flare or external emissions of hydrocarbons.

Further disclosed is a method for removing acid-gas contaminants from liquid. The method includes the steps of collecting a first distinct aqueous phase from the liquid and introducing an acid into the first distinct aqueous phase, the first distinct aqueous phase having a first concentration of acid-gases, a first concentration of associated conjugate bases, and a first pH, wherein the acid reduces the first pH of the first distinct aqueous phase to a second pH, the second pH being lower than the first pH and passing a substantially sweet gas phase through the first distinct aqueous phase at the second pH, resulting in a vapor phase comprising liberated acid-gas vapors and stripping gas vapors, and a second distinct aqueous phase comprising a second, lower concentration of acid-gases and associated conjugate bases relative to the first distinct aqueous phase.

The method further includes the steps of separating and collecting the liberated acid-gas and stripping gas vapors; separating and collecting the second distinct aqueous phase; and treating the second distinct aqueous phase, resulting in a final aqueous product having a lower concentration of acid-gases and associated conjugate bases than the second distinct aqueous phase. In some embodiments, the method further comprises the step of generating the stripping gas. In other embodiments, the method includes the step of treating at least a portion of the liberated acid-gas vapors and stripping gas vapors to remove acid-gas components, resulting in a clean stripping gas product. Still in other embodiments, the method further includes the steps of recovering the clean stripping gas product and reusing the clean stripping gas product in the step of passing a substantially sweet gas phase through the first distinct aqueous phase at the second pH.

DETAILED DESCRIPTION

In one embodiment of an apparatus according to the present disclosure, a supply of mixed production comprising at least natural gas and salt water, having an initially elevated first concentration of acid-gases and their respective conjugate bases, may be treated to remove substantially all derived species of one or more acid-gas contaminants, resulting in a natural gas product and a final saltwater product, the final saltwater product having a second concentration of target acid-gases and their respective conjugate bases that is substantially and measurably zero.

In upstream oil and gas exploration and production, the fluids produced from subterranean formations are characterized as mixed production, defined by the coexistence of crude oil, natural gas, natural gas condensate, and water in a single production stream. The conditions of a mixed production stream are dictated by reservoir parameters, such as pressure, temperature, and depth. Generally, mixed production fluids are separated into at least a gas component and a liquid component in a separation apparatus located on or proximate a producing well pad. Initial separation into component streams based on phase behavior is done in part to allow measurement of each produced fluid. In some cases, these initially separated fluids are re-mixed before entering a distribution line to leave the producing well pad. In other cases, the gas phase remains separated from the liquid phase and is transferred off a producing pad by means of distinct flow lines.

Figure 1:
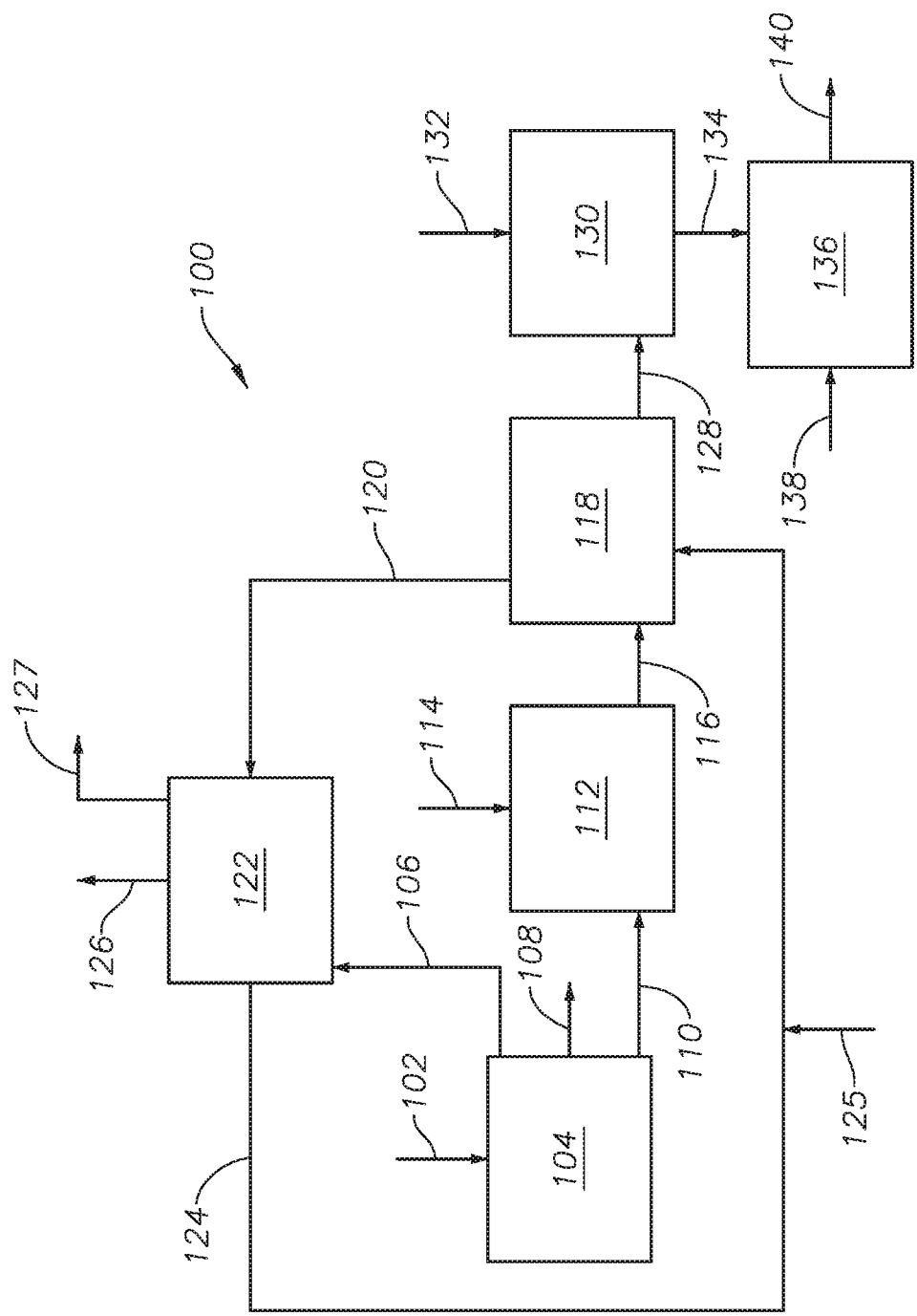
FIG. 1 is a system schematic illustrating one embodiment of an apparatus according to the present disclosure.

Referring now to FIG. 1, a system schematic is provided illustrating one embodiment of an apparatus according to the present disclosure. In FIG. 1, system 100 includes a mixed production inlet feed 102 comprising at least natural gas and salt water. In some embodiments, mixed production inlet feed 102 optionally includes oil and natural gas condensate having an initially elevated first concentration of acid-gas components. In some embodiments, mixed production inlet feed 102 comprises fluids from a single producing well. In other embodiments, mixed production inlet feed 102 is an aggregate of fluids from more than one producing well. In an example embodiment, mixed production inlet feed 102 is a field-mixed production stream having approximate molar concentrations of hydrocarbons, salt water, acid-gas components, and other gases being 53%, 42%, 5%, and 1%, respectively. An example temperature and pressure of mixed production inlet feed 102 may be approximately 40 degrees Celsius (° C.) and 290 pounds per square inch gauge (psig), respectively. In an example embodiment, the saltwater portion of mixed production inlet feed 102 may contain 190,000 ppmw of total dissolved solids. In other embodiments, the saltwater portion of mixed production inlet feed 102 may contain a greater or lesser concentration of total dissolved solids that is a result of fluid mixing and contact with soluble rock in the subsurface reservoir.

The aforementioned composition is provided as an example and is not meant to be limiting in scope. The concentration of total dissolved solids in the aqueous phase of mixed production inlet feed 102 does not impact performance of the present disclosure. Similarly, the disclosed process can be modified with equipment sizing, without diverging from the scope of this disclosure, to successfully treat and remove acid-gas components from a wide range of mixed production fluids comprising at least a gas phase and an aqueous phase, regardless of inlet stream conditions. One of ordinary skill in the art will understand that units not shown can be used in embodiments of the present disclosure, such as pumps, valves, blowers, and condition monitoring units. System 100 further includes a mixed production separation apparatus 104 into which mixed production inlet feed 102 flows.

In a process implemented in the apparatus depicted in FIG. 1, in a first step, a sour mixed production stream containing a hydrocarbon and aqueous phase, for example a mixture of sour natural gas and sour salt water, is introduced to the system at the mixed production inlet feed 102 and is separated in mixed production separation apparatus 104 into a predominately hydrocarbon sour gas stream 106, a predominately hydrocarbon sour liquids stream 108, and a predominately aqueous sour stream 110. As used here, "predominately hydrocarbon" refers to a process stream comprising a majority of hydrocarbon components and a minimal concentration of water, for example being less than about 1% on a molar basis. Similarly, "predominantly aqueous" refers to a process stream comprising a majority of water and a minimal concentration of hydrocarbon components, for example being less than about 1% on a molar basis.

An example of a suitable mixed production separation apparatus is a three phase separator designed to split a single inlet feed into three distinct streams by density and thermodynamic partitioning properties. A second example of a suitable separator is a two phase separator designed to split a single inlet feed into two distinct streams, for example a gas stream and a liquids stream. Such example separators may be considered high stage separators, operating at high pressure based on wellhead pressure, or low stage separators, operating at lower pressure than high stage separators and serving as a second stage of separation after initial production. In some embodiments, example separators may follow initial compression of the produced fluids, therefore operating at a pressure greater than wellhead pressure. The mixed production separation apparatus 104, in accordance with the present disclosure, may represent either an initial separation apparatus located on or proximate a producing well pad or a second separation apparatus located at an offsite facility.

It should be recognized by one of ordinary skill in the art that, in some embodiments, the mixed production separation apparatus 104 may, in fact, include a multitude of separation steps resulting in a multitude of predominately hydrocarbon sour streams. For purposes of the present disclosure, process streams of concern include a predominately hydrocarbon sour gas stream 106, for example having a molar concentration of water that is less than 1%, and a predominately aqueous sour stream 110, for example having a molar concentration of total hydrocarbon material that is less than 1%.

Generally, mixed production separation apparatus 104 is operated to separate process streams by phase partitioning into at least a gas phase and a liquids phase. Acid-gases, such as hydrogen sulfide and carbon dioxide, partition into both phases, particularly in the presence of water. In an example embodiment, the gas phase separated from mixed production inlet feed 102 may contain approximately 8% molar concentration of acid-gas species, and the aqueous phase separated from mixed production inlet feed 102 may contain approximately 0.1% molar concentration of acid-gas species. In some embodiments, the concentration of hydrogen sulfide in the aqueous phase separated from mixed production inlet feed 102 may be approximately 1,700 ppmw. Dissolved solids in salt water generally do not partition into the gas phase, instead remaining wholly in the aqueous phase. The relative concentrations of total dissolved species determine the natural pH of the aqueous phase. In some embodiments, the natural pH of the aqueous phase separated from mixed production inlet feed 102 may be approximately neutral, or between pH 6 and pH 8. In other embodiments, the natural pH of the aqueous phase separated from mixed production inlet feed 102 may be slightly alkaline, being greater than pH 8, or slightly acidic, being less than pH 6.

Following separation in the mixed production separation apparatus 104, predominately hydrocarbon sour gas stream 106 is transferred to a process unit for sour gas treatment 122. The predominately aqueous sour stream 110 is transferred to an acidic chemical mixing apparatus 112, representing the first in a series of process steps for sour water treatment in accordance with the present disclosure.

Relating to sour water treatment, still with reference to FIG. 1, an acidic chemical is introduced by acidic chemical inlet feed 114 to be mixed with the predominately aqueous sour stream 110 in a first sour water treatment step in an acidic chemical mixing apparatus 112. Examples of suitable acids that may be introduced at the acidic chemical inlet feed 114 include, without limitation, hydrochloric acid, citric acid, acetic acid, sulfuric acid, nitric acid, or other acidic chemicals having the capability of decreasing the pH of an aqueous solution.

Figure 2A:
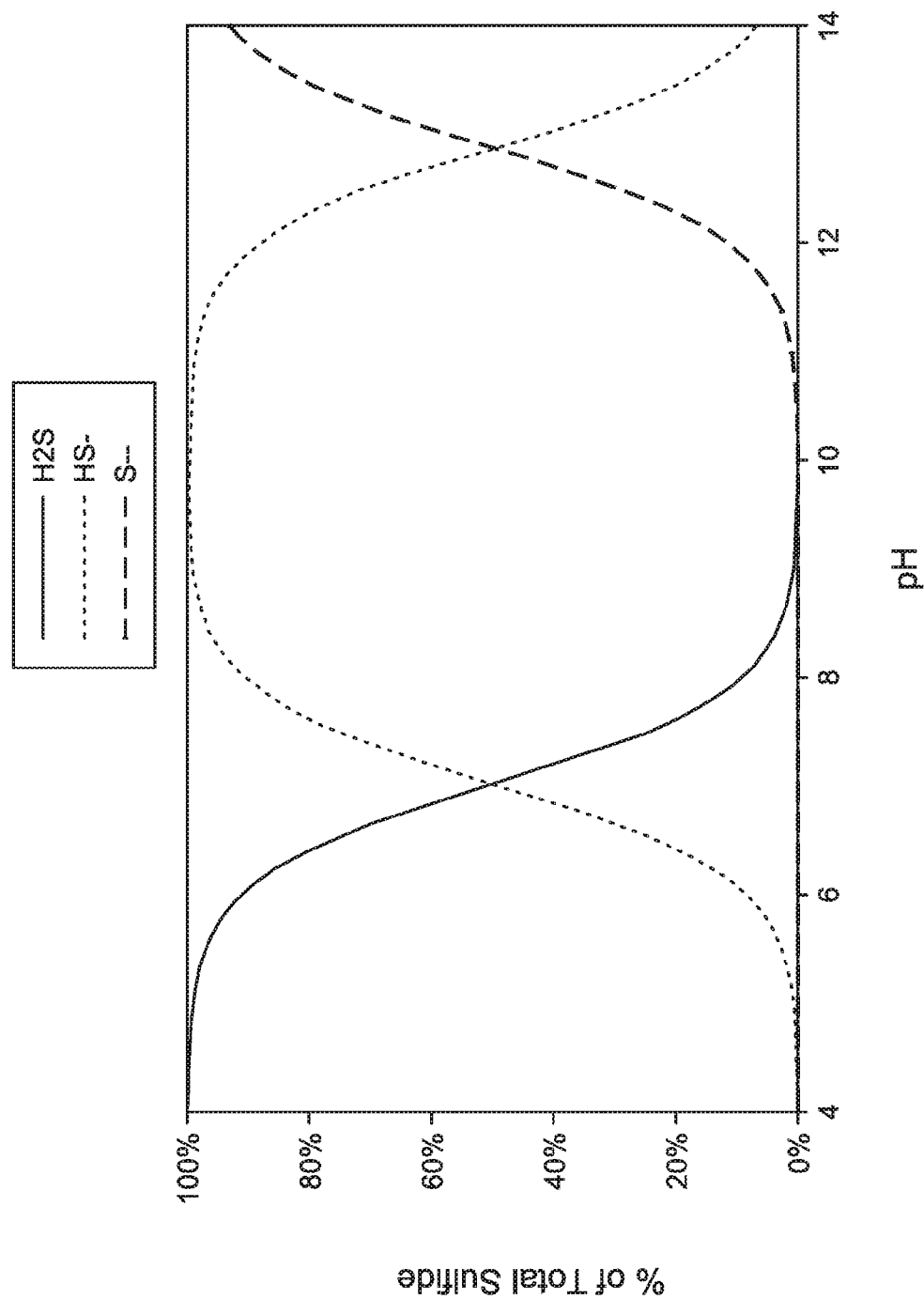
FIG. 2A is a graph showing hydrogen sulfide dissociation first into bisulfide ion (HS), and then further into sulfide ion ($S^2$) based on an increase in pH.
Figure 2B:
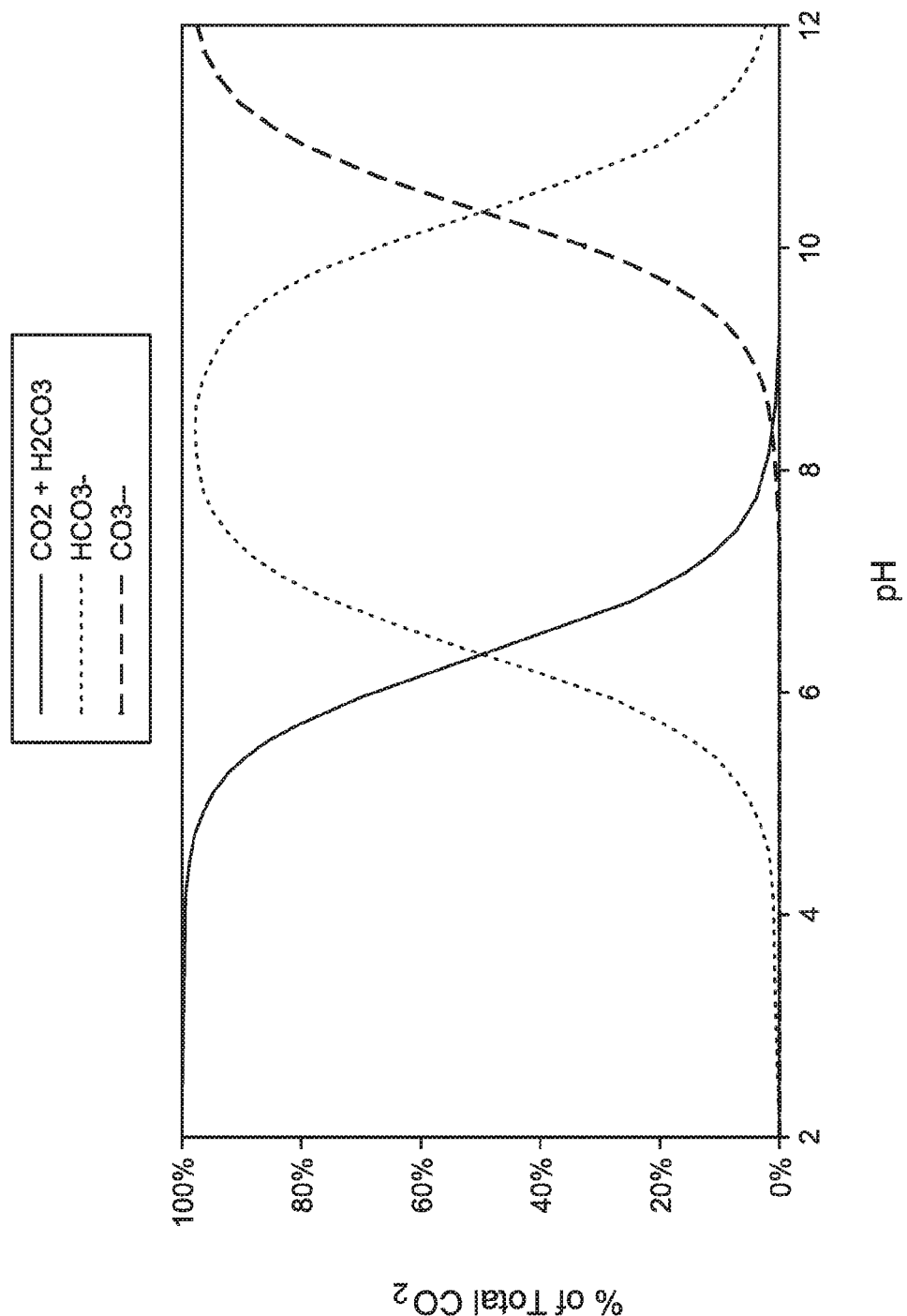
FIG. 2B is a graph showing a first reaction between carbon dioxide ($CO_2$) and water, forming carbonic acid ($H_2CO_3$), and a subsequent dissociation of carbonic acid, first into bicarbonate ion ($HCO_3^-$), and then further into carbonate ion ($CO_3^{2-}$) based on an increase in pH.

The resulting aqueous solution discharge stream 116 proceeding from the acidic chemical mixing apparatus 112 may have a substantially identical combined concentration of acid-gases and their conjugate bases as that of the predominately aqueous sour stream 110, but with a measurably lesser pH. The pH of the resulting aqueous solution discharge stream 116 may be less than approximately a pH of 4 to promote the formation of approximately 99.9% of total sulfide by molar equivalent into the hydrogen sulfide species, in accordance with FIG. 2A. In some embodiments, a pH greater or less than 4 may be desirable and may be calculated by one skilled in the art such that a desired fraction of the total combined concentration of the target acid-gas exists as the conjugate base species in the resulting aqueous solution discharge stream 116. In other embodiments, a lower pH of approximately 3.3 may be desirable to convert 99.9% of total carbon dioxide and bicarbonate species into the gaseous dissolved form to promote the removal of carbon dioxide, in accordance with FIG. 2B.

In an aqueous solution, acid-gases, such as hydrogen sulfide and carbon dioxide, dissociate based on equilibrium conditions into hydronium ions ($H_3O^+$) and their respective conjugate bases. In lesser pH solutions, the acid-gas species dominate, and in greater pH solutions, the conjugate base species dominate. For example, hydrogen sulfide dissociates with increasing pH, first into bisulfide ion (HS), and then further into sulfide ion ($S^{2-}$), as shown in the graph in FIG. 2A. Similarly, carbon dioxide reacts with water to form carbonic acid ($H_2CO_3$), which dissociates with increasing pH first into bicarbonate ion ($HCO_3^-$), and then further into carbonate ion ($CO_3^{2-}$), as shown in the graph in FIG. 2B. In some embodiments, a lesser pH may be desired such that a majority of the total acid-gas species exists as the dissolved gas species in solution, more easily removable by gas stripping. For example, a pH less than 4 may be desired such that approximately 99.9% of total sulfide in the water exists as the hydrogen sulfide species. In accordance with observations disclosed herein, a lesser pH may be desired to facilitate acid-gas removal by an anoxic gas stripping step, described herein as a second sour water treatment process step.

In a second process step, and still with reference to FIG. 1, stripping gas stream 124 is introduced to the resulting aqueous solution discharge stream 116 inside a gas-water contactor vessel 118. The rate at which the stripping gas stream 124 is introduced into the gas-water contactor vessel 118 may be calculated by one skilled in the art such that the equilibrium-altering potential of the stripping gas stream 124 is sufficient to remove a desired fraction of dissolved acid-gases from the resulting aqueous solution discharge stream 116. In an example embodiment, sufficient hydrogen sulfide removal may be achieved when the molar flow ratio of resulting aqueous solution discharge stream 116 to stripping gas stream 124 is approximately 35. In such an example embodiment, it may be desirable that gas-water contactor vessel 118 operates at near-ambient conditions at low pressure, for example near 0 psig, to promote efficient gas removal from resulting aqueous solution discharge stream 116. In such an example embodiment, it may also be desirable that neither resulting aqueous solution discharge stream 116 nor stripping gas stream 124 is purposefully heated or cooled.

As noted, system 100 includes a gas-water contactor vessel 118, and further includes a process unit for sour gas treatment 122, an inlet feed for supplementary stripping gas 125, an inlet feed of acid-gas scavenging chemical 132 for aqueous-phase treatment, a mixing apparatus for acid-gas scavenging of the aqueous phase 130, an inlet feed of alkaline chemical 138, an alkaline chemical mixing apparatus 136, a sweetened outlet aqueous product stream 140 with a final concentration of target acid-gas and associated conjugate base that is substantially zero, a sour waste stream 127, and an outlet vapor product stream 126 with a final concentration of target acid-gas that is desirably less than the initial concentration of target acid-gas and acid-gas conjugate base species in predominately hydrocarbon sour gas stream 106, for example being at a concentration sufficient to meet sales gas pipeline specification or at a concentration that is substantially zero.

Gas-water contactor vessel 118 may be designed by one skilled in the art such that the contact efficiency of the introduced stripping gas stream 124 and the resulting aqueous solution discharge stream 116 from the acidic chemical mixing apparatus 112 is substantially optimized. In some embodiments, the gas-water contactor vessel 118 may be a horizontal tank with an internal sparge bar for injecting the stripping gas stream 124. In other embodiments, a vertical contactor column with either internal trays or packing material(s) to provide sufficient turbulence for even gas and liquid distribution, or any contactor vessel that may be designed by one skilled in the art with the purpose of maximizing vapor-liquid contact efficiency, can be used. In some embodiments, the gas-water contactor vessel 118 may be designed as a batch-treating unit or as a continuous treatment unit. In some embodiments, the gas-water contactor vessel 118 is designed to be a single-pass treating unit.

In some embodiments, gas-water contactor vessel 118 may be operated to remove 99.6% of total sulfide species, on a molar flow basis, from resulting aqueous solution discharge stream 116. In other embodiments, gas-water contactor vessel 118 may be operated to remove greater or less than 99.6% of total sulfide species to achieve a desired concentration that can be calculated by one skilled in the art to be operationally and economically efficient.

The aforementioned process conditions are provided as examples and are not intended to be construed as limiting in scope. It is understood that gas-water contactor vessel 118 may be sized and designed according to inlet process stream conditions, and the molar flow ratio of resulting aqueous solution discharge stream 116 to stripping gas stream 124 may be adjusted, to sufficiently and efficiently remove target acid-gas components from resulting aqueous solution discharge stream 116.

In a preferred embodiment, the stripping gas stream 124 is introduced to the gas-water contactor vessel 118 at a temperature approximately equal to the temperature of the resulting aqueous solution discharge stream 116 so as to limit heat transfer from the stripping gas to the aqueous process stream. In applications of sour water stripping where the sour solution is predominately fresh water having a low concentration of total dissolved solids, the addition of heat is advantageous to the stripping process. However, limiting such heat transfer may be desirable for treating sour salt water, where adding heat to the system may exacerbate scaling tendencies.

Limiting the amount of heat addition required also has the benefit of limiting heating costs and associated equipment. In some embodiments, the natural temperature of the stripping gas stream 124 may be greater or less than the natural temperature of the resulting aqueous solution discharge stream 116. In such embodiments, it may be desirable that the stripping gas stream 124 is introduced to the gas-water contactor vessel 118 at a temperature that is greater or less than the temperature of the resulting aqueous solution discharge stream 116 to maintain the benefit that no heat addition is required in the system. For example, in some cases, the resulting aqueous solution discharge stream 116 may have a temperature of approximately 40° C., and the stripping gas stream 124 may have a temperature of approximately 16° C.

In some embodiments, the stripping gas is anoxic, or substantially without oxygen, being for example nitrogen, methane, natural gas, any of the noble gases, or combinations thereof. An anoxic stripping gas is advantageous as compared with an oxygenated stripping gas for applications involving a hydrocarbon-bearing saltwater system, as the use of an oxygenated stripping gas can impose corrosion, scaling, and explosion risks on the system. The addition of oxygen to a hydrocarbon-bearing system can induce a combustion risk. In the presence of certain salts that may exist in produced water, for example iron, the addition of oxygen can cause oxidation, thereby inducing a scaling or solids formation risk. Furthermore, the addition of oxygen to otherwise anoxic environments can induce corrosion of certain metal components that are found commonly in oilfield equipment, such as mild carbon steel.

In some aspects, the composition of stripping gas stream 124 is selected to substantially alter the vapor-liquid equilibrium of the aqueous system such that dissolved acid-gases preferentially exsolve from the aqueous phase and mix into the stripping gas. In accordance with observations disclosed herein, the primary requirement of the stripping gas to ensure efficient sour water treatment is that the stripping gas is substantially sweet, or substantially free of acid gases.

In some cases, embodiments of an apparatus according to the present disclosure may include a gas generator proximate the other apparatus components, such as a nitrogen generator. The gas generator may generate stripping gas on location from an alternate feedstock, such as air. In such embodiments, the generated gas may represent a portion or the whole of the stripping gas stream 124 injected into the gas-water contactor vessel 118. In some embodiments, the generated gas is introduced to stripping gas stream 124 via supplementary stripping gas stream 125. In some embodiments, the supplementary stripping gas stream 125 introduced to stripping gas stream 124 may be taken from a stripping gas source, such as a liquid nitrogen or compressed methane tanker. In other embodiments, supplementary stripping gas stream 125 may supply the whole portion of stripping gas stream 124 introduced to gas-water contactor vessel 118.

In certain embodiments, supplementary stripping gas stream 125 may have substantially similar properties as described herein for stripping gas stream 124, or supplementary stripping gas stream 125 can have different properties than stripping gas stream 124. For one example, supplementary stripping gas stream 125 represented in FIG. 1 can have substantially the same properties as the stripping gas introduced to stripping gas inlet 308 represented in FIG. 3, comprising pure nitrogen gas. In such an example, only pure nitrogen gas can be provided by supplementary stripping gas stream 125 to gas-water contactor vessel 118, or pure nitrogen gas in supplementary stripping gas stream 125 can be mixed with a different stripping gas in stripping gas stream 124, such as methane, and the mixed stripping gas combination can be introduced into gas-water contactor vessel 118. One of ordinary skill in the art can control the flow of streams 124, 125 to provide an advantageous mixture of stripping gas to gas-water contactor vessel 118.

In some embodiments, stripping gas stream 124 contains natural gas that is co-produced with salt water in a mixed production stream. In such embodiments, direct use of the predominately hydrocarbon sour gas stream 106 separated from the mixed production inlet feed 102 as a sour water stripping gas may be infeasible and costly due to the elevated concentration of acid-gas components in the gas phase that result from equilibrium conditions with the aqueous phase, as dictated by Henry's Law and related thermodynamic principles. As such, it may be desirable that the initially sour natural gas in predominately hydrocarbon sour gas stream 106 is treated in a sour gas treatment process unit, such as process unit for sour gas treatment 122, to remove acid-gas components and improve stripping efficiency in the gas-water contactor vessel 118.

Relating to sour gas treatment, and still with reference to FIG. 1, process unit for sour gas treatment 122 may be designed by one skilled in the art to sufficiently remove sour components from a gas stream. In some embodiments, an amine scrubber may be used for sour gas treatment. In other embodiments, selective membrane separation, pressure-swing adsorption, caustic scrubbing, or another process designed for the removal of acid-gas components from a gaseous stream may be used. In other embodiments, a combination of known treatment technologies may be used in parallel or in series and together combine to make up process unit for sour gas treatment 122. In an example embodiment, a process unit for sour gas treatment may include a combination of at least flash separation equipment, absorber towers, refrigeration cycles, and fractionator or distillation towers. Such example process units may be designed and operated by one skilled in the art such that a desired removal of hydrogen sulfide and a desired split of hydrocarbon species by molecular weight are achieved. Generally, the desired component splits are achieved by varying temperature and pressure in a series of equilibrium stages, optionally also effecting component separation by the introduction of absorber chemical, for example with the addition of methyl diethanolamine (MDEA) to an absorber tower in an amine unit to strip hydrogen sulfide gas from a sour gas stream.

In some embodiments, process unit for sour gas treatment 122 is used to generate a stream of substantially sweet gas, such as stripping gas stream 124, that may be further used in a gas stripping step in a concurrent water treatment process, while also generating a second stream of substantially sweet gas, such as outlet vapor product stream 126, that enters a natural gas sales line. In such embodiments, process unit for sour gas treatment 122 effectively serves the dual purpose of treating sour hydrocarbon field gas to generate one or more valuable products for sale, in addition to a product to be reused in a water treatment process. In some embodiments, both streams of substantially sweet gas in stripping gas stream 124 and outlet vapor product stream 126 may be treated to an identical extent by process unit for sour gas treatment 122, and therefore have substantially equivalent compositions.

In some embodiments, process unit for sour gas treatment 122 additionally generates a sour waste stream 127 comprising substantially all acid-gas species desirably removed from the second sour natural gas stream 120 and a minimal concentration of residual natural gas products of value. In such embodiments, the sour waste stream 127 may be collected and transferred out of the process. In some embodiments, the sour waste stream 127 may be discharged to a registered waste disposal site, such as an acid-gas injection well for subterranean injection or a flare stack for combustion. In other embodiments, the sour waste stream 127 may be transferred to a sulfur recovery process that may be designed by one skilled in the art to generate a valuable sulfur product, for example by means of a Claus process for sulfur generation. In an example embodiment, the sour waste stream 127 may have a molar composition of acid-gas components that is approximately 95%, with the remaining 5% being predominately hydrocarbon components. In such an example embodiment, the molar flow ratio of hydrocarbon material in the sour waste stream 127 relative to the total hydrocarbon molar flow rate in predominately hydrocarbon sour gas stream may be approximately 0.4%.

In other embodiments, as may be the case in a co-located sour gas processing plant, an operator may desire that the substantially sweet gas entering a natural gas sales line, such as outlet vapor product stream 126, is treated to a greater extent than the substantially sweet gas to be used in a concurrent sour water treatment process, such as in stripping gas stream 124. For example, in some cases, natural gas entering a sales line must meet specifications relating to hydrocarbon composition in addition to acid-gas contamination. However, the primary specification of stripping gas quality concerns acid-gas contamination, and hydrocarbon composition generally is an insignificant factor driving separation efficiency. In such cases, an operator may desire that the composition of substantially sweet gas to be used as a sour water stripping gas in stripping gas stream 124 is materially different than the composition of substantially sweet gas entering a natural gas sales line such as outlet vapor product stream 126, and, for example, has a less stringent specification for hydrocarbon composition. In an example embodiment, process unit for sour gas treatment 122 may comprise an amine unit followed subsequently by a fractionator. In such example embodiment, stripping gas stream 124 may be treated only by an amine unit, and outlet vapor product stream 126 may be further treated by a fractionator to generate a product adhering to stricter pipeline quality specifications.

In some embodiments related to the co-location of a sour water treatment facility and a sour gas processing facility as disclosed herein, one advantageous property is that the predominately hydrocarbon sour gas stream 106 separated from the mixed production inlet feed 102 is not wasted, spent, or lost as a result of the sour water treatment process. In such embodiments, substantially sweet gas to be used in sour water stripping in stripping gas stream 124 represents a portion of the total sour gas in the predominately hydrocarbon sour gas stream 106 separated from the mixed production inlet feed 102.

The substantially sweet natural gas used in sour water stripping in stripping gas stream 124 enters the gas-water contactor vessel 118 at an inlet feed point located near the bottom of the vessel such that the gas has substantial contact time with the liquid in the vessel to induce sour gas stripping. The stripping gas stream 124 mixes with the resulting aqueous solution discharge stream 116 and exits the gas-water contactor vessel 118 as a second sour natural gas stream 120, having a substantially greater concentration of acid-gas components that have been exsolved from the resulting aqueous solution discharge stream 116. The second sour natural gas stream 120 is then sent to the process unit for sour gas treatment 122 and is re-introduced to the predominately hydrocarbon sour gas stream 106 to be treated. One advantage of recycling second sour natural gas stream 120 is that generally, to a point, increasing stripping gas vapor molar flow, such as stream 124, relative to the liquid molar flow, such as stream 116, improves acid-gas removal. In the present disclosure, since used stripping gas is recovered via process unit for sour gas treatment 122, there is the operational flexibility to increase the stripping gas flow rate to remove acid-gases without increasing the amount of flared or wasted used stripping gas.

As such, the molar flow rate of natural gas in and out of the process unit for sour gas treatment 122 is substantially balanced such that the molar flow rate of natural gas in the substantially sweet gas in stripping gas stream 124 is approximately equal to that of the second sour natural gas stream 120. Similarly, the molar flow rate of natural gas species in the predominately hydrocarbon sour gas stream 106 is approximately equal to aggregated flow rates of natural gas species of the substantially sweet gas in outlet vapor product stream 126 and the sour waste stream 127. In an example embodiment, the molar flow ratio of hydrocarbon material in sour waste stream 127 relative to the molar flow of hydrocarbon material in the predominately hydrocarbon sour gas stream 106 is less than approximately 0.4%. In such an embodiment, such small amount of hydrocarbon material is lost to sour waste stream 127 as a result of normal operation of process unit for sour gas treatment 122, and is not a result of the concurrent sour water treatment process. Thus, the process of sour water stripping in a gas-water contactor vessel 118 with sweetened natural gas in stripping gas stream 124 taken from the process unit for sour gas treatment 122 results in no additional lost natural gas product.

This result is advantageous and improves sour water treatment economics by eliminating the need for outside stripping gas while also retaining full production rates entering the natural gas sales line. In enabling the ability to use, treat, and retain substantially all produced natural gas in the mixed production inlet feed 102, an additional advantage gained by the current disclosure is the ability to eliminate the need for additional flared waste gas or additional sour waste gas injection capacity. In some cases, the field assumption in gas stripping applications is that the exhausted stripping gas in the second sour natural gas stream 120 coming off the gas-water contactor vessel 118 would by necessity be sent to a flare stack or otherwise exit the system as a result of now having an elevated concentration of acid-gas components that makes it unusable for sour water stripping. Moreover, in embodiments of systems and methods of the present disclosure, treated sour water results in a sweet water product that can be disposed of in saltwater disposal systems without any fear of $H_2S$ generation. This is a major upgrade in safety, and will greatly diminish saltwater costs even if the water is not re-used.

In a third sour water treatment process step, and still with reference to FIG. 1, a substantially sweetened aqueous product stream 128 discharged from the gas-water contactor vessel 118 may be further treated with an acid-gas scavenging chemical. The substantially sweetened aqueous product stream 128 may have a substantially lower concentration of target acid-gases than the resulting aqueous solution discharge stream 116, for example, approximately 0-50 ppmw. Additionally, as a result of the gas stripping process, the substantially sweetened aqueous product stream 128 may have a pH that is greater than the pH of the resulting aqueous solution discharge stream 116.

In a mixing apparatus for acid-gas scavenging of the aqueous phase 130, an acid-gas scavenging chemical is provided by an inlet feed of acid-gas scavenging chemical 132, and the acid-gas scavenging chemical is introduced at a rate that can be calculated by one skilled in the art such that the resulting concentrations of target acid-gases and their respective conjugate bases are substantially zero, or at a level greater than zero that is desired for a specific end-use.

In some embodiments, the inlet feed of acid-gas scavenging chemical 132 that is introduced to mixing apparatus for acid-gas scavenging of the aqueous phase 130 can include any one of or any combination of chlorine dioxide, acrolein, triazine, monoethanolamine, amines, or other scavenging chemicals known in the art to react with and substantially reduce the concentration of target acid-gases in aqueous process streams. In some embodiments, the inlet feed of acid-gas scavenging chemical 132 may be selected such that a secondary treatment target is achieved. For example, chlorine dioxide may provide additional benefit as an iron scavenger in produced water treatment applications and may be selected as the aqueous-phase acid-gas scavenging chemical to scavenge both dissolved acid-gas components, such as conjugate bases, and iron.

In an example embodiment, inlet feed of acid-gas scavenging chemical 132 may comprise chlorine dioxide. In such an example embodiment, the amount of chlorine dioxide chemical in inlet feed of acid-gas scavenging chemical 132 introduced to substantially sweetened aqueous product stream 128 in mixing apparatus for acid-gas scavenging of the aqueous phase 130 is a mass ratio relative to total residual sulfide concentration in substantially sweetened aqueous product stream 128 that is at least approximately 3.2, or enough to ensure sufficient and complete conversion of dissolved sulfide species to sulfate reaction products. In some example embodiments, chlorine dioxide is generated on location from precursor chemicals in a chlorine dioxide generator proximate inlet feed of acid-gas scavenging chemical 132. In other example embodiments, chlorine dioxide may be generated in situ in the aqueous phase as the result of introducing precursor chemicals to substantially sweetened aqueous product stream 128 and imposing pH conditions sufficiently low to effect the conversion of precursor chemicals to chlorine dioxide.

In some embodiments, the systems and methods of the present disclosure are carried out and executed in the absence of acrolein for use as a scavenger. In some embodiments of the present disclosure, using chlorine dioxide enables injection directly into a pipeline containing a stripped water product as the stripped water product goes to a final storage vessel, as chlorine dioxide reacts substantially instantly with the residual sulfide species in the stripped water product. Fast reaction time of chlorine dioxide enables inline scavenger chemical injection and direct transfer of stripped product from gas-water contactor vessel 118 to a final storage vessel without requiring intermediate storage, degassing, or reaction vessels. This result is advantageous, as it maximizes cost reduction and operational simplicity and minimizes site footprint by eliminating reaction and storage vessels that may be required of alternative processes, such as using slow-reacting or hazardous chemicals, for example acrolein.

In some embodiments, one skilled in the art may elect to use either acrolein or chlorine dioxide in inlet feed of acid-gas scavenging chemical 132, based on certain factors regarding the chemistry of the aqueous phase separated from mixed production inlet feed 102 and the chemistry of downstream process units to which sweetened outlet aqueous product stream 140 may be transferred. In general, the selection of chlorine dioxide or acrolein chemistry depends on the presence of certain minerals known to react with sulfate species that may result from the reaction of chlorine dioxide with hydrogen sulfide species to generate solid byproducts. Examples of such minerals that are present in some hydrocarbon-bearing reservoirs include barium, calcium, and strontium. Acrolein can be costly, slower to react with acid-gas species, and more hazardous to handle than chlorine dioxide.

On the other hand, the reaction of barium and sulfate forms the mostly insoluble product, barite. Additionally, the reaction of chlorine dioxide with hydrogen sulfide forms sulfate products. However, acrolein does not react with hydrogen sulfide to form sulfate products. Thus, using chlorine dioxide in inlet feed of acid-gas scavenging chemical 132 to react with hydrogen sulfide, when barium is also present in the aqueous phase separated from mixed production inlet feed 102, can result in the formation and deposition of solid barite scale on equipment internals or in downstream process components. Barite scaling risk is exacerbated by the presence of naturally-occurring radioactive material ("NORM"), such as radium, when it exists also with barium, strontium, and calcium. When presented with a sulfate source, these minerals co-precipitate with NORM to generate hazardous solid waste byproduct that generally requires special, costly handling procedures.

Furthermore, even in the absence of barium in the aqueous phase separated from mixed production inlet feed 102, using chlorine dioxide to react with hydrogen sulfide to form sulfate products may lead to barite deposition in downstream process components if a barite source is also present. This may be the case when the sweetened outlet aqueous product stream 140 is subsequently injected into a reservoir comprising barium species, for example as a hydraulic fracturing fluid, as a registered waste disposal, or as an enhanced oil recovery fluid. Therefore, in applications where barium may be present in either the aqueous phase separated from mixed production inlet feed 102 or in downstream process units, it can be advantageous to use acrolein in inlet feed of acid-gas scavenging chemical. In some embodiments, acrolein may be brought to a location to be used. In other embodiments, acrolein may be generated on location from precursor chemicals by an acrolein generator located proximate inlet feed of acid-gas scavenging chemical 132. Notably, the products of the reaction between acrolein and hydrogen sulfide-related species in water are water soluble compounds and do not result in solids formation that cause disposal issues or operational problems downstream of the injection point.

In some aspects, a scale inhibitor or chelating agent may be introduced with the acid-gas scavenger chemical at the inlet feed of acid-gas scavenging chemical 132 to limit solids deposition as a result of oxidation or other chemical reactions. For example, an iron chelating agent, such as citric acid, may be introduced along with chlorine dioxide to chelate the resultant iron species and limit solids formation. Similarly, a sulfate scale inhibitor, for example phosphonate scale inhibitors such as bis-hexamethylenetriamine penta (methylene phosphonic) acid ("BHPMP") may be introduced to prevent sulfate scaling as a result of elevated sulfate ion concentration following the reaction between chlorine dioxide and hydrogen sulfide.

In some embodiments, the mixing apparatus for acid-gas scavenging of the aqueous phase 130 may be a vessel designed to induce efficient contact between the acid-gas scavenger chemical in the inlet feed of acid-gas scavenging chemical 132 and the substantially sweetened aqueous product in substantially sweetened aqueous product stream 128, such as a contact column, static mixer, or batch reactor. In other cases, an operator may prefer that the mixing apparatus for acid-gas scavenging of the aqueous phase 130 entails simply an injection point for the chemical in a pipeline carrying the substantially sweetened aqueous product stream 128. In such cases, the facility footprint may be minimized as a result of eliminating an additional contact vessel.

In some embodiments, a sweet aqueous product stream 134 leaving the mixing apparatus for acid-gas scavenging of the aqueous phase 130 may be further treated with an alkaline chemical for pH adjustment in an alkaline chemical mixing apparatus 136 to increase the pH of the sweetened water product to a final pH desired for a predetermined end-use. In some embodiments, an amount of alkaline chemical, for example potassium hydroxide or sodium hydroxide, can be added by inlet feed of alkaline chemical 138 so that the final pH of a sweetened water product in sweetened outlet aqueous product stream 140 is approximately neutral, or approximately pH 7, for safe water handling, transfer, and storage. In other embodiments, an amount of alkaline chemical may be added such that the final pH of the sweetened water product in sweetened outlet aqueous product stream 140 is in a range determined to be most compatible with a subsequent hydraulic fracturing fluid treatment. In other embodiments, an amount of alkaline chemical may be added such that the final pH of the sweetened water product in sweetened outlet aqueous product stream 140 is in a range determined to be suitable for registered waste disposal.

In some embodiments of the apparatus shown in FIG. 1, the process components described herein may be utilized in multiplicity, in parallel or in series. For example, a multitude of gas-water contactor vessels, such as gas-water contactor vessel 118, can be used in series to achieve greater acid-gas removal than is capable by a single vessel. Furthermore, in some embodiments, an operator may desire to perform more than one disclosed process step in a single process unit so as to reduce the site footprint or cost or otherwise achieve a particular design or operational objective.

For example, a single vessel may be used to achieve the combined purposes of the mixing apparatus for acid-gas scavenging of the aqueous phase 130 and alkaline chemical mixing apparatus 136. One of ordinary skill in the art will recognize that one or multiple recycle lines may be incorporated into an apparatus described herein, as is commonly the case in field applications, without deviating from the scope of the present disclosure. For example, inline process monitoring equipment may be incorporated to measure final acid-gas concentration and recycle off-spec fluid back to various treatment steps.

In certain embodiments, the series of sour water treatment process steps described herein is implemented inline, without incorporating intermediate vessels to store the aqueous product. Such embodiments enable site footprint and capital cost reduction for an installation by minimizing the number and size of vessels and pumps on location, while also simplifying operation. In other embodiments, the disclosed system and method may be implemented in a batch treatment scheme. In such embodiments, a single, distinct batch of sour water may be treated wholly by the series of disclosed sour water treatment process steps to generate a single, distinct batch of treated water having a final concentration of target acid-gases that is substantially zero. Such a batch treatment system may be installed and used to treat a single batch of sour water, or it may be used to treat a multitude of successive, distinct batches of fluid.

In some embodiments, the systems and methods disclosed herein may be used to treat a produced fluid extracted from a subterranean formation as the result of oil and gas operations, such that the safe handling and reuse of the produced fluid is obtained as a result of the treatment. For example, the method and system may be used to eliminate hydrogen sulfide and its related conjugate base species from an aqueous process fluid such that downstream processes (e.g., mixing with an acidic solution) can be performed safely without risk of recontamination and release of hydrogen sulfide vapors, such as for example to a sweet hydrocarbon-bearing reservoir. Furthermore, the sweetened fluid may be recycled for hydraulic fracturing operations, or may now be safe for subterranean injection in either registered waste disposal zones or as an enhanced oil recovery fluid, without concerns of souring the target reservoir.

To facilitate a better understanding of the system and method disclosed herein, the following examples are provided. The examples demonstrate the capacity of the disclosed apparatus and method to remove hydrogen sulfide, a commonly targeted acid-gas, substantially completely from a hydrocarbon-bearing saltwater solution for reuse as a hydraulic fracturing fluid for oil and/or natural gas producing wellbores.

Example 1

Figure 3:
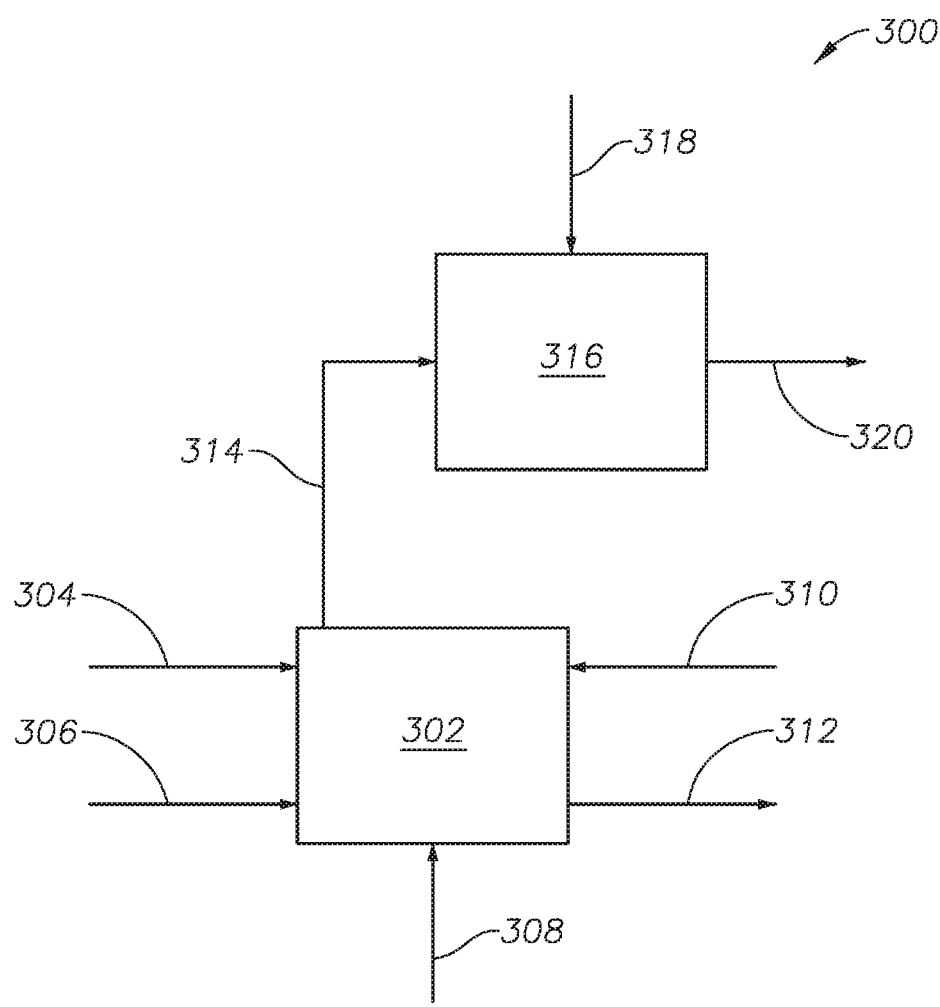
FIG. 3 is a system schematic illustrating an embodiment of an apparatus according to the present disclosure.

Referring now to FIG. 3, a system schematic is provided illustrating an embodiment of an apparatus according to the present disclosure. System 300 was set up at a field location, and a total of 500 barrels of produced water from two nearby operating oil and gas wells were collected from a point downstream of preliminary 3-phase separation equipment. A horizontal contactor vessel 302 with an internal sparge bar was used, and the fluid was treated in two batches of approximately 250 barrels each. For both batches, after filling the horizontal contactor vessel 302 with hydrocarbon-bearing sour salt water at a sour water inlet feed 304, the following were introduced sequentially into the same horizontal contactor vessel 302: 15% hydrochloric acid at an acid inlet feed 306; nitrogen gas as the anoxic stripping gas at a stripping gas inlet 308; and chlorine dioxide solution as the acid-gas scavenging chemical at acid-gas scavenging inlet 310. In this case, the horizontal contactor vessel 302 served substantially the same purposes of the process units 112, 118, 130, and 136 shown in FIG. 1.

Additionally, a process unit for sour gas treatment 316 was used to remove hydrogen sulfide gas from the vapors discharged at a vapor outlet 314 from the horizontal contactor vessel 302. The process unit for sour gas treatment 316 was a chemical scrubber filled with amine-based hydrogen sulfide scavenging chemical from amine-based hydrogen sulfide scavenging chemical inlet stream 318, and sweetened vapors from sweetened vapors outlet 320 were composed of primarily nitrogen gas and water vapor, which were released to atmosphere. Following the duration of each batch treatment, the full batch volume of sweetened water was extracted from the single horizontal contactor vessel 302 by sweetened water outlet stream 312.

The target acid-gases of the treatment in the present example were hydrogen sulfide and carbon dioxide, although additional treatment capabilities were demonstrated by the test results. A methylene blue test kit, following United States Environmental Protection Agency (USEPA) Method 376.2, was selected to measure hydrogen sulfide concentration in water in the field. The methylene blue test was selected for measuring total sulfide species in saline, hard (high calcium and magnesium concentration) water produced from one or more subsurface formations. The test is capable of measuring all species of hydrogen sulfide, including the dissociated bisulfide and sulfide species. Additional compositional analysis was conducted by a laboratory, including alkalinity measurements (total combined concentration of carbonic acid and related conjugate bases) by means of bicarbonate compositional analysis.

The described process steps were executed in a different order for each batch to demonstrate the effect of various process variables on the performance of the system and to validate the unique order of process steps described in this disclosure.

Figure 4A:
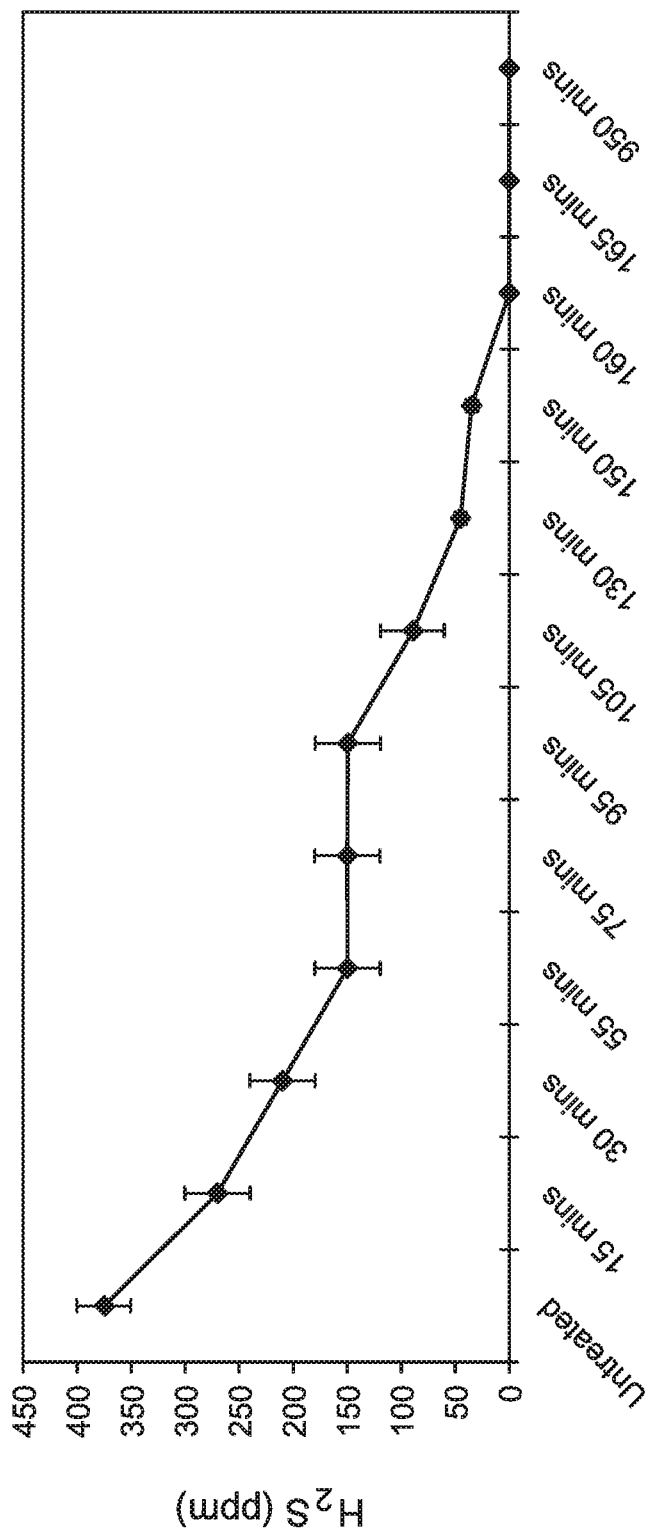
FIG. 4A is a graph showing the results achieved during an example acid-gas stripping process according to the present disclosure.
Figure 4B:
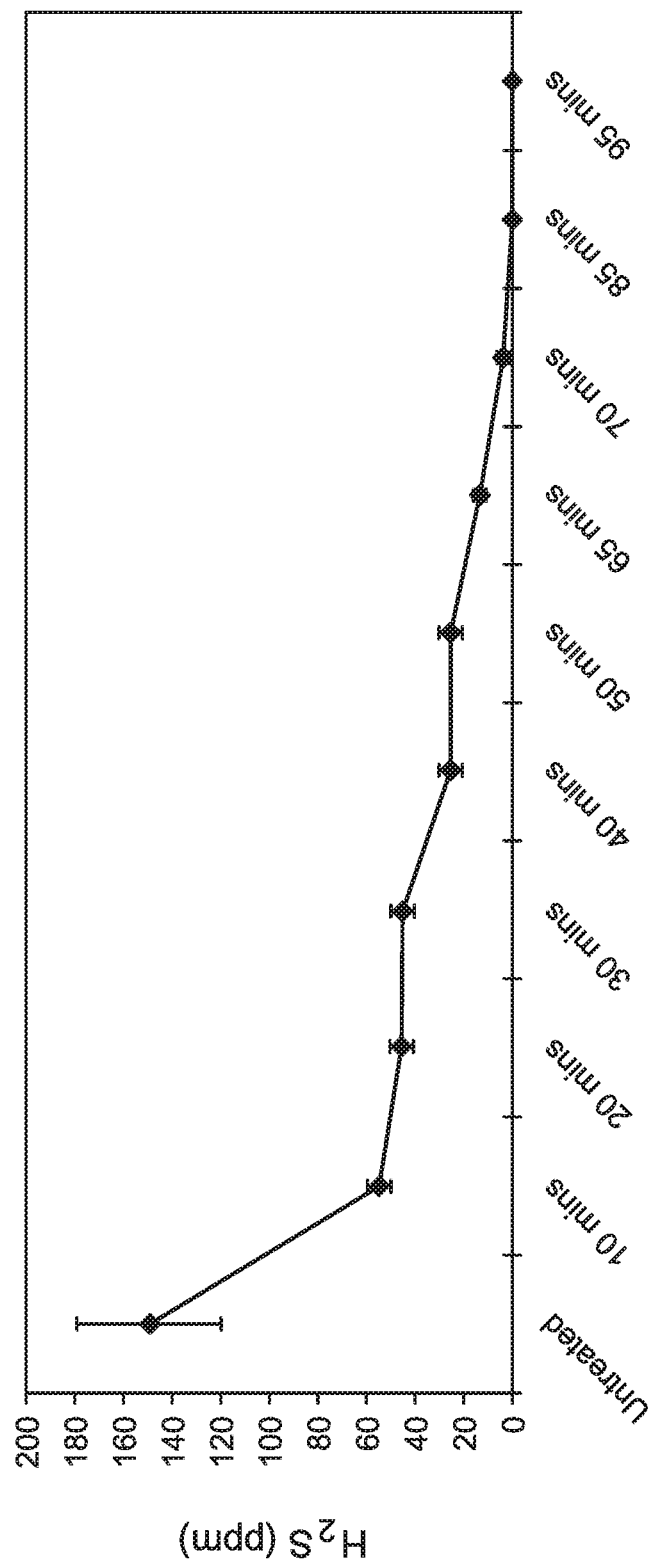
FIG. 4B is a graph showing the results achieved during an example acid-gas stripping process according to the present disclosure.

In a first process application, nitrogen gas at stripping gas inlet 308 was injected as the first process step, followed by introduction of acid at acid inlet feed 306 in addition to continued nitrogen gas injection, and then chlorine dioxide was added at acid-gas scavenging inlet 310. In a second application, acid was added to the produced water as a first step, followed by nitrogen gas injection, followed by chlorine dioxide addition. In the second process application, the rate of nitrogen gas was also varied to determine the optimum injection rate. Because both applications were batch treatments, to evaluate the results of the processes, the concentration of total hydrogen sulfide acid-gas and conjugate bases in the aqueous phase was plotted with respect to the duration of the treatment. FIGS. 4A and 4B plot these results for the first and second process applications, respectively.

While the above described examples are for batch processing of sour water, one of ordinary skill in the art will understand that the apparatus and methods described herein may be applied to continuous, inline processes as well. Those skilled in the art will appreciate that sizing of the various mixers and contacting vessels should be selected, along with sour water, stripping gas, and pH increasing chemical feed rates, such that the reactions described with respect to batch processing will be substantially completed within any continuous feed implementation. While nitrogen was used as an anoxic stripping gas, other stripping gases, such as methane, can be used when the stripping gas is substantially free of an impurity to be removed by the stripping gas.

Comparing the results in FIGS. 4A and 4B demonstrates that the completeness and relative speed of acid-gas removal is limited when pH adjustment is not used as a first process step. FIG. 4A shows that, without initial acid addition, a maximum of 60% of the total hydrogen sulfide and related species can be removed by nitrogen injection alone at 20 scm/min injection rate. However, following the addition of acid to reduce pH to approximately 3, continued injection of nitrogen gas at a constant rate of 20 scm/min was capable of removing up to 88% of total hydrogen sulfide species.

In FIG. 4B, hydrochloric acid was added to the aqueous system to reduce the pH to approximately 3 at the start of the batch treatment, and then nitrogen gas was injected at increasing rates between 10-20 scm/min to evaluate the effect of stripping gas flow rate, along with the effect of having a lower initial pH. The second application demonstrates that the completeness of acid-gas removal is strongly dependent on the rate of stripping gas injected. At 10 scm/min, a maximum of 70% hydrogen sulfide removal is observed, but by increasing the rate to 20 scm/min, up to 95% hydrogen sulfide removal is observed. FIG. 4B also demonstrates that the quickness of acid-gas removal is dramatically assisted by beginning the treatment process with an initial step to inject acid into the aqueous system and lower its pH to approximately less than 5.

Table 1 shows additional laboratory analysis of the waters tested at selected chronological points of the treatment process. Here, alkalinity is defined as the combined concentration of dissolved carbon dioxide-related species, including carbonic acid and its conjugate bases, as represented in terms of the mass of calcium carbonate ($CaCO_3$).

TABLE 1

Certain Experimental Results.

Trial 1 (ppmw)

| | |
|---|---|
| TDS: | 187,123 |
| Hardness (as $CaCO_3$): | 35,148 |

| | Inlet | After Gas Stripping | After Chlorine Dioxide |
|---|---|---|---|
| $H_2S$ | 375 | 45 | 0 |
| Akalinity (as $CaCO_3$) | 518 | 0 | 0 |
| Total Hydrocarbons | 53 | 4.6 | 3.1 |

Trial 2 (ppmw)

| | |
|---|---|
| TDS: | 182,966 |
| Hardness (as $CaCO_3$): | 30,054 |

| | Inlet | After Gas Stripping | After Chlorine Dioxide |
|---|---|---|---|
| $H_2S$ | 150 | 10 | 0 |
| Akalinity (as $CaCO_3$) | 287 | 0 | 0 |
| Total Hydrocarbons | 38 | 20.7 | 13.5 |

In both the first and second applications, the total concentration of hydrogen sulfide, as well as carbon dioxide, and their related conjugate bases in the final treated aqueous solution was substantially zero. Thus, the processes and apparatus disclosed herein were found to be capable of removing substantially all hydrogen sulfide and carbon dioxide and associated conjugate base species from a hydrocarbon-bearing saltwater solution.

Example 2

Process simulation software was used to test the effect of various stripping gas compositions on overall hydrogen sulfide removal from sour produced water. In four distinct trials, pure nitrogen gas, pure methane gas, a mixture of gases formulated to represent an example sweet natural gas stream, and a mixture of gases formulated to represent an example sour natural gas stream were tested as example stripping gases. The gas-water contactor vessel was modeled as a gas stripper column of vertically stacked equilibrium stages. In each test, the variables that were monitored at the top, middle, and bottom of the gas stripper column were: the gas-liquid partitioning coefficient for $H_2S$, K; the concentration of hydrogen sulfide, C, in ppmw; the temperature, T, in ° C.; and the pressure, P, in psig. Process parameters other than molar composition remained constant between each trial. Pressure and temperature of the inlet stripping gas feed were kept constant at 16.1° C. and 3.0 psig. Pressure, temperature, and hydrogen sulfide concentration of the inlet sour water feed were kept constant at 32.7° C., 3.0 psig, and 1,710 ppmw. The inlet liquid to inlet gas molar flow ratio was kept constant at 34.9 for each test.

Table 2 shows results from each test. Comparison of data from Trials 1-3 demonstrates that methane or a sweet mixture of hydrocarbons and other gases representing an example sweet natural gas stream can be used as a stripping gas in lieu of nitrogen with effectively comparable results. In each case, final residual hydrogen sulfide concentration in the treated water exiting the stripping column is approximately 6.0-6.1 ppmw. Other process parameters, including the gas-liquid partitioning coefficient for $H_2S$, the temperature, and the pressure of the resultant sweet water stream, are effectively unchanged as well. As a result of these findings, data obtained using nitrogen gas as a stripping gas can be reasonably used as good predictors of results for applications in which methane or a sweet natural gas mixture is used as a replacement stripping gas.

Comparison of test data form Trial 4 with the test data from Trials 1-3 demonstrates that the presence of hydrogen sulfide in the stripping gas is a major factor detrimentally impacting sour water stripping performance. The stripping gas used for Trial 4 represented an example sour natural gas stream that was separated from a sour mixed production stream comprising hydrogen sulfide, carbon dioxide, natural gas, natural gas condensate, and salt water. The sour natural gas stream was then used directly as a stripping gas without receiving treatment to remove hydrogen sulfide vapors. In this case, final residual hydrogen sulfide concentration in the treated water exiting the sour water stripper is 648 ppmw, representing a significantly greater concentration compared with results obtained from Trials 1-3. The consequence of this data is that sour natural gas that is typically produced with sour water in oil and gas activities cannot be successfully used in a sour water stripping application without receiving treatment to remove hydrogen sulfide vapors.

TABLE 2

Certain Experimental Results.

Trial 1: Nitrogen

| Composition of stripping gas: | 100 mol% nitrogen | | | |
|---|---|---|---|---|
| | $K_{H2S}$ | $C_{H2S}$ (ppmw) | T (° C.) | P (psig) |
| Top of gas stripper | 207 | 266 | 32.8 | 2.84 |
| Middle of gas stripper | 206 | 42.2 | 32.7 | 2.92 |
| Bottom of gas stripper | 203 | 6.0 | 32.0 | 3.00 |

Trial 2: Methane

| Composition of stripping gas: | 100 mol-% methane | | | |
|---|---|---|---|---|
| | $K_{H2S}$ | $C_{H2S}$ (ppmw) | T (° C.) | P (psig) |
| Top of gas stripper | 208 | 265 | 32.8 | 2.84 |
| Middle of gas stripper | 207 | 42.0 | 32.7 | 2.92 |
| Bottom of gas stripper | 203 | 6.0 | 32.0 | 3.00 |

TABLE 2-continued

Certain Experimental Results.

Trial 3: Sweet natural gas mixture

| Composition of stripping gas: | 90 mol-% methane<br>6 mol-% ethane<br>2 mol-% propane | 1 mol-% nitrogen<br><1 mol-% C4+ | |
|---|---|---|---|

| | $K_{H2S}$ | $C_{H2S}$ (ppmw) | T (° C.) | P (psig) |
|---|---|---|---|---|
| Top of gas stripper | 208 | 270 | 32.8 | 2.84 |
| Middle of gas stripper | 207 | 43.0 | 32.8 | 2.92 |
| Bottom of gas stripper | 203 | 6.1 | 32.1 | 3.00 |

Trial 4: Sour natural gas mixture

| Composition of stripping gas: | 77 mol-% methane<br>8 mol-% hydrogen sulfide<br>7 mol-% ethane<br>4 mol-% propane | 2 mol-% C4<br>1 mol-% nitrogen<br><1 mol-% C5+<br><1 mol-% carbon dioxide | |
|---|---|---|---|

| | $K_{H2S}$ | $C_{H2S}$ (ppmw) | T (° C.) | P (psig) |
|---|---|---|---|---|
| Top of gas stripper | 208 | 813 | 33.0 | 2.84 |
| Middle of gas stripper | 207 | 667 | 33.0 | 2.92 |
| Bottom of gas stripper | 204 | 648 | 32.4 | 3.00 |

Example 3

Figure 5:
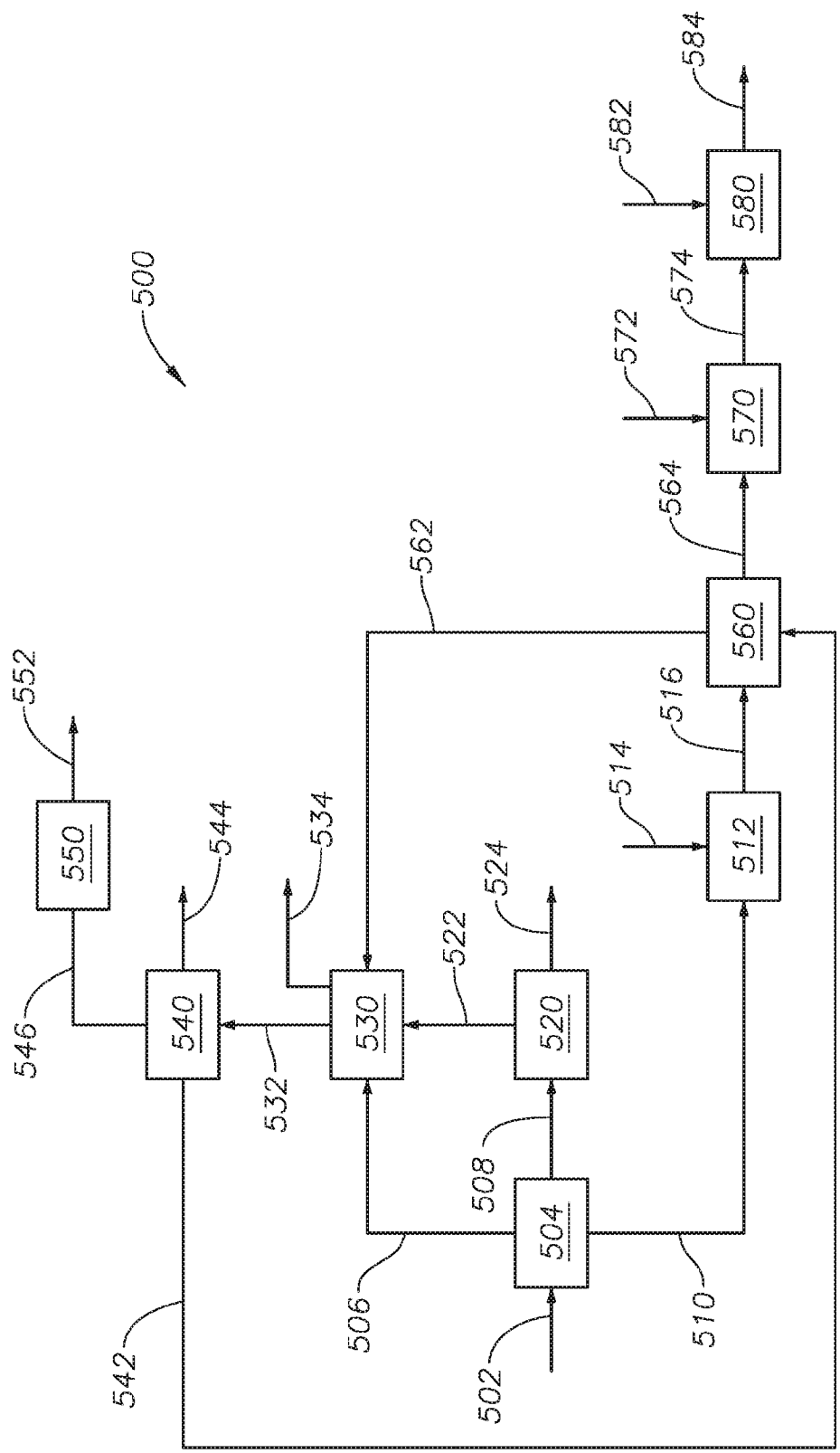
FIG. 5 is a system schematic illustrating an example embodiment of an apparatus according to the present disclosure.

Referring now to FIG. 5, a system schematic is provided illustrating an embodiment of an apparatus according to the present disclosure. Process simulation of system 500 was performed to test the effect of combining a natural gas processing plant with a water treatment facility on overall process efficiency. An inlet mixed production stream 502, comprising a mixture of paraffinic, naphthenic, and aromatic hydrocarbons, salt water, hydrogen sulfide, carbon dioxide, and other gases, was produced at field conditions of 40° C. and 290 psig and fed to mixed production separator 504. Mixed production separator 504 was operated as a series of three phase separators to split inlet mixed production stream 502 into natural gas stream 506, natural gas condensate stream 508, and aqueous stream 510.

Natural gas condensate stream 508 was transferred to condensate stabilizer 520. Condensate stabilizer 520 was operated at conditions suitable for separating gases from greater molecular weight hydrocarbon liquids, including lesser molecular weight hydrocarbon gases, hydrogen sulfide, and carbon dioxide. Condensate stabilizer heavy product stream 524, exiting condensate stabilizer 520, had a composition suitable to meet condensate sales pipeline specification. Condensate stabilizer overhead product stream 522 from condensate stabilizer 520 was fed to amine unit 530 and blended with natural gas stream 506.

Aqueous stream 510 was transferred to acidic chemical mixer 512 and blended with acidic chemical stream 514, composed of 15% hydrochloric acid by weight in water. The reduced pH aqueous mixture stream 516 exiting acidic chemical mixer 512 was transferred to sour water stripper 560.

In sour water stripper 560, sweet stripping gas stream 542 was introduced to reduced pH aqueous mixture stream 516. Sour water stripper 560 was operated at ambient temperature conditions and low pressure conditions to facilitate the dissolution of hydrogen sulfide vapors into the gas phase from the aqueous phase. Resulting de-gassed water product 564 exiting sour water stripper 560 was collected and transferred to chlorine dioxide injection point 570. Resulting sour stripping gas stream 562 exiting sour water stripper 560 was transferred to amine unit 530 and blended with condensate stabilizer overhead product stream 522 and natural gas stream 506.

Amine unit 530 was operated to substantially remove hydrogen sulfide vapors from sour gas streams using an MDEA contactor-regenerator loop. Hydrogen sulfide and carbon dioxide vapors resulting from the MDEA treatment process were collected in acid gas stream 534, exiting amine unit 530. Resultant sweet vapors were collected in sweet gas stream 532 and transferred from amine unit 530 to fractionator 540.

Fractionator 540 was operated to split hydrocarbon components in sweet gas stream 532 into sales NGLs stream 544, low-pressure sales gas stream 546, and sweet stripping gas stream 542. Low-pressure sales gas stream 546 had a composition suitable to meet sales gas pipeline specification and was collected and transferred to sales gas compressor 550. Sales gas compressor 550 was operated to pressurize low-pressure sales gas stream 546 to pipeline conditions for sale via high-pressure sales gas stream 552. Sweet stripping gas stream 542 was collected and transferred to sour water stripper 560. Sweet stripping gas stream 542 was handled separately from low-pressure sales gas stream 546 to allow for the successful operation of sales gas compressor 550, which was sized smaller than would be required to process the combined throughput of low-pressure sales gas stream 546 and sweet stripping gas stream 542, enabling cost savings by minimizing equipment sizing.

De-gassed water product 564 exiting sour water stripper 560 was transferred to chlorine dioxide injection point 570 and mixed with chlorine dioxide inlet feed 572. Chlorine dioxide injection point 570 was operated such that the mass flow ratio of chlorine dioxide in chlorine dioxide inlet feed 572 to residual total sulfide in de-gassed water product 564 was sufficient to scavenge substantially all residual sulfide components. Such mass flow ratio was calculated stoichiometrically to be greater than 3.2.

The resultant sweet water product stream 574 was collected and transferred to alkaline chemical mixer 580 and mixed with alkaline solution stream 582, composed of 15% sodium hydroxide by weight in water. Alkaline chemical mixer 580 was operated such that outlet sweet water stream 584 had a final pH suitable for reuse as a hydraulic fracturing fluid. Such pH was approximately 6.5.

Table 3 displays test results detailing key inlet and outlet stream compositions for the case relating to FIG. 5.

TABLE 3

Experimental Results Using Treated Field Gas as Stripping Gas.

| | 502 (kmol/h) | 552 (kmol/h) | 544 (kmol/h) | 524 (kmol/h) |
|---|---|---|---|---|
| C1-C2 | 12,584 | 12,524 | 11 | 0 |
| C3-C4 | 945 | 350 | 539 | 55 |
| C5+ | 897 | 10 | 4 | 882 |
| $H_2S$ | 1,260 | 0 | 0 | 0 |
| $CO_2$ | 52 | 2 | 0 | 0 |
| Water | 11,300 | 0 | 0 | 0 |
| Salts | 764 | 0 | 0 | 0 |
| Temp. (° C.) | 40 | 48 | 32 | 49 |
| Press. (psig) | 290 | 1,276 | 435 | 245 |

TABLE 3-continued

Experimental Results Using Treated Field Gas as Stripping Gas.

|  | 534 (kmol/h) | 584 (kmol/h) | 546 (kmol/h) | 542 (kmol/h) |
|---|---|---|---|---|
| C1-C2 | 50 | 0 | 12,524 | 356 |
| C3-C4 | 0 | 0 | 350 | 10 |
| C5+ | 0 | 0 | 10 | 0 |
| $H_2S$ | 1,260 | 0 | 0 | 0 |
| $CO_2$ | 49 | 0 | 2 | 0 |
| Water | 19 | 11,281 | 0 | 0 |
| Salts | 0 | 764 | 0 | 0 |
| Temp. (° C.) | 70 | 40 | 40 | 20 |
| Press. (psig) | 3,300 | 0 | 870 | 100 |

Figure 6:
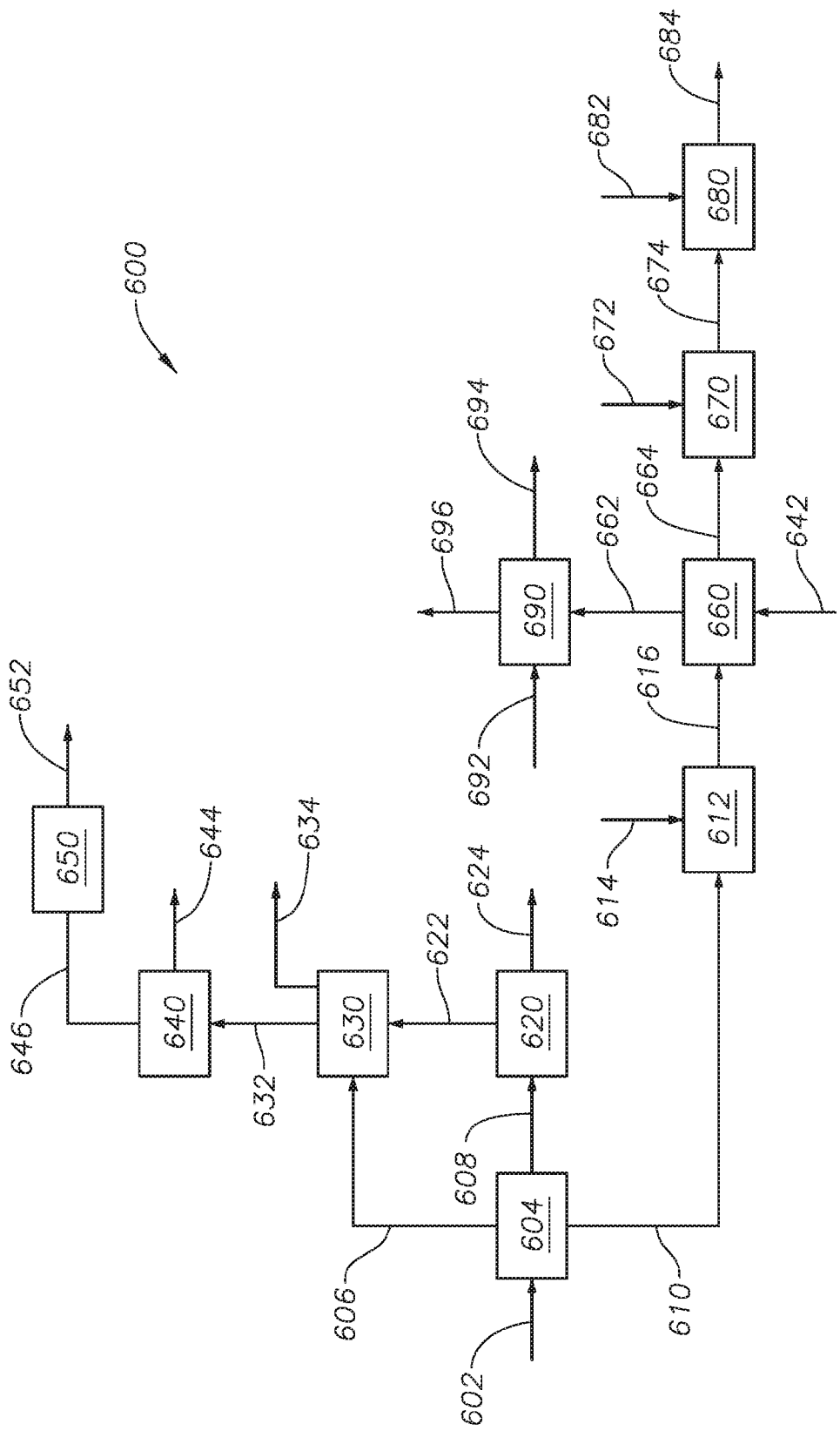
FIG. 6 is a system schematic illustrating an example alternative sour water treatment system.

Referring now to FIG. 6, a system schematic is provided illustrating an alternative sour water stripping apparatus in which an external source of clean stripping gas is introduced to system 600 via sweet stripping gas inlet feed 642. With the exception of sweet stripping gas inlet feed 642 and sour stripping gas stream 662, streams and process units 602 through 684 in system 600 correspond to streams and process units 502 through 584 in system 500 in operation and functionality, as described previously.

In a first case, henceforth referred to as Case 1, sweet stripping gas inlet feed 642, comprising nitrogen gas, was introduced to sour water stripper 660 and was mixed with reduced pH aqueous mixture stream 616. Sour water stripper 660 was operated at ambient temperature conditions and low pressure conditions to facilitate the dissolution of hydrogen sulfide vapors into the gas phase from the aqueous phase. Resulting de-gassed water product 664 exiting sour water stripper 660 was collected and transferred to chlorine dioxide injection point 670. Resulting sour stripping gas stream 662 exiting sour water stripper 660 was transferred to sour vapor scrubbing unit 690.

In sour vapor scrubbing unit 690, sour stripping gas stream 662 was passed through a solution of 13% molar concentration MDEA in water that was introduced to sour vapor scrubbing unit 690 by MDEA inlet feed 692. Sour vapor scrubbing unit 690 was operated with sufficient contact time to completely absorb all hydrogen sulfide gas contaminants in sour stripping gas stream 662. Treated waste gas stream 696 exiting sour vapor scrubbing unit 690, having reduced concentration of hydrogen sulfide species such that safe release of the vapors is possible, was vented to atmosphere. Spent MDEA stream 694, having absorbed hydrogen sulfide species from sour stripping gas stream 662, was collected and removed from sour vapor scrubbing unit 690 for disposal.

Sour vapor scrubbing unit 690 was operated such that the molar flow of MDEA in MDEA inlet feed 692 was substantially equal to the molar flow of MDEA in spent MDEA stream 694. The molar flow rate of new MDEA introduced to sour vapor scrubbing unit 690 via MDEA inlet feed 692 was calculated to be sufficient to safely absorb all hydrogen sulfide in sour stripping gas stream 662. In this example, this ratio was determined to be approximately 4.2.

Table 4 displays test results detailing key inlet and outlet stream compositions for the first case relating to FIG. 6.

TABLE 4

Experimental Results Introducing Clean Nitrogen as Stripping Gas.

| | 602 (kmol/h) | 642 (kmol/h) | 692 (kmol/h) | 652 (kmol/h) | 644 (kmol/h) |
|---|---|---|---|---|---|
| C1-C2 | 12,584 | 0 | 0 | 12,524 | 11 |
| C3-C4 | 945 | 0 | 0 | 350 | 539 |
| C5+ | 897 | 0 | 0 | 10 | 4 |
| $H_2S$ | 1,260 | 0 | 0 | 0 | 0 |
| $CO_2$ | 52 | 0 | 0 | 2 | 0 |
| Water | 11,300 | 0 | 364 | 0 | 0 |
| MDEA | 0 | 0 | 55 | 0 | 0 |
| $N_2$ | 0 | 370 | 0 | 0 | 0 |
| Salts | 764 | 0 | 0 | 0 | 0 |

| | 624 (kmol/h) | 634 (kmol/h) | 684 (kmol/h) | 694 (kmol/h) | 696 (kmol/h) |
|---|---|---|---|---|---|
| C1-C2 | 0 | 50 | 0 | 0 | 0 |
| C3-C4 | 55 | 0 | 0 | 0 | 0 |
| C5+ | 882 | 0 | 0 | 0 | 0 |
| $H_2S$ | 0 | 1,247 | 0 | 13 | 0 |
| $CO_2$ | 0 | 49 | 0 | 0 | 0 |
| Water | 0 | 5 | 11,281 | 364 | 14 |
| MDEA | 0 | 0 | 0 | 55 | 0 |
| $N_2$ | 0 | 0 | 0 | 0 | 370 |
| Salts | 0 | 0 | 764 | 0 | 0 |

In a second case, henceforth referred to as Case 2, sweet stripping gas inlet feed 642 instead comprised methane gas and was similarly introduced to sour water stripper 660 to be mixed with reduced pH aqueous mixture stream 616. In this case, because methane is a combustible fluid, sour stripping gas stream 662 was instead transferred to a flare stack where both methane and the hydrogen sulfide vapors stripped from reduced pH aqueous mixture stream 616 in sour water stripper 660 were combusted and burned in the presence of oxygen.

Table 5 displays test results detailing key inlet and outlet stream compositions for the second case relating to FIG. 6.

TABLE 5

Experimental Results Introducing Clean Methane as Stripping Gas.

| | 602 (kmol/h) | 642 (kmol/h) | 652 (kmol/h) | 644 (kmol/h) |
|---|---|---|---|---|
| C1-C2 | 12,584 | 370 | 12,524 | 11 |
| C3-C4 | 945 | 0 | 350 | 539 |
| C5+ | 897 | 0 | 10 | 4 |
| $H_2S$ | 1,260 | 0 | 0 | 0 |
| $CO_2$ | 52 | 0 | 2 | 0 |
| Water | 11,300 | 0 | 0 | 0 |
| Salts | 764 | 0 | 0 | 0 |

| | 624 (kmol/h) | 634 (kmol/h) | 684 (kmol/h) | 662 (kmol/h) |
|---|---|---|---|---|
| C1-C2 | 0 | 50 | 0 | 370 |
| C3-C4 | 55 | 0 | 0 | 0 |
| C5+ | 882 | 0 | 0 | 0 |
| $H_2S$ | 0 | 1,247 | 0 | 13 |
| $CO_2$ | 0 | 49 | 0 | 0 |
| Water | 0 | 5 | 11,281 | 14 |
| Salts | 0 | 0 | 764 | 0 |

Comparing the data presented in Tables 3, 4, and 5 demonstrates that system 500 requires less inlet feed chemical and generates less outlet waste product than either configuration of system 600. In system 500, 99.6% of total inlet C1-C2 hydrocarbons and 99.8% of total inlet water are surprisingly and unexpectedly recovered as valuable product, without the use of external stripping gas outside of sweet stripping gas stream 542, which is produced from inlet mixed production stream 502.

In Case 1 of system 600, an equivalent 99.6% of total inlet C1-C2 hydrocarbons are recovered as valuable product, but only 96.7% of total inlet water is recovered. The additional inlet feed chemical requirement for Case 1 includes 32.7 kmol/h of clean nitrogen gas and 37.1 kmol/h of clean 13% molar ratio MDEA in water, per 1,000 kmol/h of installed water treatment capacity. The additional waste generated in Case 1 includes spent MDEA stream 694, being 38.2 kmol/h per 1,000 kmol/h of installed water treatment capacity and having 3.0% molar concentration of hydrogen sulfide, and treated waste gas stream 696, being 34.0 kmol/h per 1,000 kmol/h of installed water treatment capacity.

In Case 2 of system 600, an equivalent 99.8% of total inlet water is recovered as valuable product, but only 96.8% of total inlet C1-C2 hydrocarbons is recovered. The additional inlet feed chemical requirement for Case 2 includes 32.7 kmol/h of clean methane gas per 1,000 kmol/h of installed water treatment capacity. The additional waste generated in Case 2 includes sour stripping gas stream 662, being 35.1 kmol/h per 1,000 kmol/h of installed water treatment capacity and having 3.3% molar concentration of hydrogen sulfide.

Both cases demonstrate the superior capability of system 500, in accordance with the present disclosure, for efficiently removing hydrogen sulfide from a sour water stream by minimizing required input streams, minimizing waste generated, and maximizing recovery of valuable products, as compared with the alternative sour water stripping apparatus presented in system 600.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be interpreted only by the attached claims.

What is claimed is:

1. A method for removing acid-gas contaminants from water, the method comprising the steps of:
    introducing a mixed production fluid comprising natural gas, water, and acid-gas components into a first separation apparatus;
    separating the mixed production fluid into at least a first distinct gas phase and a separate first distinct aqueous phase;
    collecting the first distinct aqueous phase and introducing an acid into the first distinct aqueous phase, the first distinct aqueous phase having a first concentration of acid-gases, a first concentration of associated conjugate bases, and a first pH, wherein the acid reduces the first pH of the first distinct aqueous phase to a second pH, the second pH being lower than the first pH;
    collecting the first distinct gas phase and treating the first distinct gas phase to remove acid-gas components therefrom, resulting in a second, substantially sweet gas phase that is substantially without acid-gas components;
    passing at least a portion of the second, substantially sweet gas phase through the first distinct aqueous phase at the second pH, resulting in a vapor phase composed of liberated acid-gas and stripping gas vapors, and a second distinct aqueous phase comprising a lower concentration of acid-gases and associated conjugate bases relative to the first distinct aqueous phase;
    separating and collecting the liberated acid-gas and stripping gas vapors;
    treating the liberated acid-gas and stripping gas vapors to remove acid-gas components, resulting in a clean stripping gas product;
    separating and collecting the second distinct aqueous phase; and
    treating the second distinct aqueous phase with a second treatment step, resulting in a final aqueous product having a lower concentration of acid-gases and associated conjugate bases than the second distinct aqueous phase.

2. The method of claim 1, further comprising the step of raising the pH of the final aqueous product, using an alkaline material, for a particular end use.

3. The method of claim 2, wherein the particular end use is hydraulic fracturing.

4. The method of claim 1, wherein the final aqueous product has a combined concentration of a target acid-gas and associated conjugate base that is substantially zero.

5. The method of claim 1, wherein a target acid-gas and associated conjugate base species are removed substantially irreversibly.

6. The method of claim 1, wherein the step of passing at least a portion of the second, substantially sweet gas phase through the first distinct aqueous phase at the second pH is conducted at ambient conditions, without addition of heat to process fluids.

7. The method of claim 1, wherein the first distinct aqueous phase comprises hydrocarbons.

8. The method of claim 1, wherein the first distinct aqueous phase and second distinct aqueous phase comprise salt water.

9. The method of claim 1, wherein a concentration of total dissolved solids in the first distinct aqueous phase exceeds 100,000 parts per million by weight (ppmw).

10. The method of claim 1, wherein a concentration of hardness minerals in the first distinct aqueous phase exceeds 10,000 ppmw as $CaCO_3$.

11. The method of claim 1, wherein the first distinct aqueous phase comprises produced water extracted from a subterranean formation.

12. The method of claim 1, wherein the second, substantially sweet gas phase is anoxic.

13. The method of claim 1, wherein the second, substantially sweet gas phase comprises natural gas.

14. The method of claim 1, wherein the second, substantially sweet gas phase is reused again as a stripping gas.

15. The method of claim 1, wherein a portion of the clean stripping gas product exits the process via a natural gas sales line.

16. The method of claim 1, further comprising the step of treating a portion of the clean stripping gas product to a further extent before the clean stripping gas product exits via a natural gas sales line.

17. The method of claim 1, wherein the second treatment step comprises introducing chlorine dioxide to the second distinct aqueous phase.

18. The method of claim 1, wherein a secondary treatment chemical is generated proximate a location of the second treatment step.

19. The method of claim 1, wherein the second treatment step comprises an introduction of chemicals selected to inhibit solids formation or deposition.

20. The method of claim 1, wherein the second treatment step comprises the introduction of chemicals selected to remove contaminants other than selected acid-gases from the first distinct aqueous phase.

21. The method of claim 1, wherein the method is performed in batches.

22. The method of claim 1, wherein the method is conducted in continuous feed.

23. A system for removing acid-gas contaminants from water, the system comprising:
- a first feed inlet fluidly coupled to a separator to supply to the separator a mixed production fluid comprising at least natural gas, water, and acid-gas components;
- a second feed inlet fluidly coupled to a first gas contactor vessel to supply a gas phase having natural gas and acid-gas components, the first gas contactor vessel in fluid communication with a vapor outlet of the separator,
  - wherein in the first gas contactor vessel a mixture of acid-gas, natural gas, and stripping gas vapors is treated to remove acid-gas components;
- a third feed inlet fluidly coupled to a mixer to supply to the mixer an aqueous solution having acid-gases and associated conjugate bases and having an initial pH, the mixer in fluid communication with a liquid outlet of the separator;
- a fourth feed inlet fluidly coupled to the mixer to supply acid to the aqueous solution in the mixer;
- a fifth feed inlet fluidly coupled to a second gas contactor vessel, the second gas contactor vessel in fluid communication with an outlet of the mixer;
- a sixth feed inlet to the second gas contactor vessel, the second gas contactor vessel in fluid communication with a vapor outlet of the first gas contactor vessel to supply stripping gas to the aqueous solution in the second gas contactor vessel;
- a seventh feed inlet to the first gas contactor vessel, the first gas contactor vessel in fluid communication with a vapor outlet of the second gas contactor vessel;
- an eighth feed inlet to an acid-gas scavenging contactor vessel, the acid-gas scavenging contactor vessel in fluid communication with a liquid outlet of the second gas contactor vessel; and
- a ninth feed inlet to the acid-gas scavenging contactor vessel fluidly coupled to a supply of acid-gas scavenger chemical.

24. The system of claim 23, wherein the mixer, the second gas contactor vessel, and acid-gas scavenging contactor vessel are formed as a single contactor unit.

25. The system of claim 23, further comprising a tenth feed inlet to an alkaline contactor vessel to supply alkaline chemical to the aqueous solution conducted therein by an eleventh feed inlet in fluid communication with a liquid outlet of the acid-gas scavenging contactor vessel.

26. The system of claim 23, wherein the second gas contactor vessel comprises an internal sparge bar.

27. The system of claim 26, wherein the internal sparge bar is used to introduce stripping gas to the aqueous solution.

28. The system of claim 26, wherein the first gas contactor vessel is substantially horizontal.

29. The system of claim 26, further comprising a recycle loop to transfer fluid from one portion of the second gas contactor vessel to another portion thereof.

30. The system of claim 23, wherein substantially no waste gas stream is flared or emitted from the system.

* * * * *